(12) United States Patent
Long et al.

(10) Patent No.: US 12,425,239 B2
(45) Date of Patent: Sep. 23, 2025

(54) AUTHENTICATING CERTIFICATE BUNDLES WITH ASYMMETRIC KEYS

(71) Applicant: Oracle International Corporation, Redwood Shores, CA (US)

(72) Inventors: Tony Long, Edmonds, WA (US); Mauruthi Geetha Mohan, Seattle, WA (US); Karthik Venkatesh, Bothell, WA (US)

(73) Assignee: Oracle International Corporation, Redwood Shores, CA (US)

( * ) Notice: Subject to any disclaimer, the term of this patent is extended or adjusted under 35 U.S.C. 154(b) by 255 days.

(21) Appl. No.: 18/447,993

(22) Filed: Aug. 10, 2023

(65) Prior Publication Data

US 2025/0055710 A1 Feb. 13, 2025

(51) Int. Cl.
*H04L 9/40* (2022.01)
*H04L 9/32* (2006.01)

(52) U.S. Cl.
CPC .......... *H04L 9/3268* (2013.01); *H04L 9/3247* (2013.01)

(58) Field of Classification Search
CPC .............................. H04L 9/3268; H04L 9/3247
See application file for complete search history.

(56) References Cited

U.S. PATENT DOCUMENTS

| | | | |
|---|---|---|---|
| 5,671,279 A | 9/1997 | Elgamal | |
| 5,699,431 A | 12/1997 | Van Oorschot et al. | |
| 7,272,714 B2 | 9/2007 | Nagaratnam et al. | |
| 7,644,270 B1 | 1/2010 | Cherukumudi et al. | |
| 8,176,328 B2 * | 5/2012 | Chen | H04L 63/0823 380/278 |
| 8,452,958 B2 | 5/2013 | Sun et al. | |
| 9,172,543 B2 | 10/2015 | Wnuk | |
| 9,197,630 B2 | 11/2015 | Sharif et al. | |
| 9,231,933 B1 | 1/2016 | Shenoy et al. | |
| 9,485,101 B2 | 11/2016 | Bowen | |

(Continued)

FOREIGN PATENT DOCUMENTS

| | | |
|---|---|---|
| CN | 112019477 A | 12/2020 |
| CN | 114884963 A | 8/2022 |

(Continued)

OTHER PUBLICATIONS

"About Azure Key Vault certificates", Retrieved from https://learn.microsoft.com/en-us/azure/key-vault/certificates/about-certificates, Feb. 8, 2023, pp. 1-8.

(Continued)

*Primary Examiner* — Ghodrat Jamshidi
(74) *Attorney, Agent, or Firm* — Invoke

(57) ABSTRACT

Operations of a digital signature manager may include detecting, in a certificate repository on a first virtual cloud network, set of one or more new certificate authority (CA) certificates; transmitting, to a key management service hosted on a second virtual cloud network, a CA dataset that includes the set of one or more new CA certificates; receiving, from the key management service, a digital signature of the CA dataset generated based at least on a global private key stored on the second virtual cloud network in a private key repository associated with the key management service; and storing the digital signature in the certificate repository in a data structure that associates the digital signature with the CA dataset.

29 Claims, 13 Drawing Sheets

(56) References Cited

U.S. PATENT DOCUMENTS

| | | | |
|---|---|---|---|
| 9,660,978 B1 | 5/2017 | Truskovsky et al. | |
| 9,680,813 B2 | 6/2017 | Sade et al. | |
| 9,794,249 B1 | 10/2017 | Truskovsky et al. | |
| 9,882,727 B1 | 1/2018 | Veladanda et al. | |
| 10,021,084 B2 | 7/2018 | Matthews et al. | |
| 10,212,147 B2 | 2/2019 | Buendgen et al. | |
| 10,621,577 B2* | 4/2020 | Castinado | G06Q 20/3224 |
| 10,652,030 B1 | 5/2020 | Levy et al. | |
| 10,764,263 B2 | 9/2020 | Rossi | |
| 10,771,261 B1 | 9/2020 | Lazar et al. | |
| 10,812,276 B2 | 10/2020 | Bojjireddy et al. | |
| 10,848,323 B2 | 11/2020 | Barr et al. | |
| 11,153,103 B2 | 10/2021 | Fynaardt et al. | |
| 11,196,570 B2 | 12/2021 | Borne-Pons et al. | |
| 11,310,059 B2 | 4/2022 | Leibmann et al. | |
| 11,362,843 B1 | 6/2022 | Jiang et al. | |
| 11,368,314 B2 | 6/2022 | Ray et al. | |
| 11,388,594 B2 | 7/2022 | Uy et al. | |
| 11,438,325 B2 | 9/2022 | Begun et al. | |
| 11,627,123 B2 | 4/2023 | Stayskal et al. | |
| 11,706,038 B1 | 7/2023 | Thakore et al. | |
| 11,888,997 B1 | 1/2024 | Bowen et al. | |
| 12,088,738 B2 | 9/2024 | Rosenthol et al. | |
| 2002/0007346 A1 | 1/2002 | Qiu et al. | |
| 2002/0174066 A1 | 11/2002 | Kleckner et al. | |
| 2003/0037234 A1 | 2/2003 | Fu et al. | |
| 2006/0047965 A1 | 3/2006 | Thayer | |
| 2006/0101510 A1 | 5/2006 | Kadyk et al. | |
| 2007/0005956 A1 | 1/2007 | Zilinskas et al. | |
| 2007/0016782 A1 | 1/2007 | Crall et al. | |
| 2007/0147619 A1 | 6/2007 | Bellows et al. | |
| 2010/0030897 A1 | 2/2010 | Stradling | |
| 2010/0325429 A1 | 12/2010 | Saha et al. | |
| 2011/0113239 A1 | 5/2011 | Fu et al. | |
| 2012/0036220 A1 | 2/2012 | Dare et al. | |
| 2012/0240192 A1* | 9/2012 | Orazi | G06F 21/10 726/4 |
| 2012/0246466 A1 | 9/2012 | Salvarani et al. | |
| 2012/0278614 A1* | 11/2012 | Choi | H04W 12/068 713/173 |
| 2013/0086642 A1* | 4/2013 | Resch | H04L 9/321 726/4 |
| 2014/0298419 A1 | 10/2014 | Boubez et al. | |
| 2015/0135299 A1 | 5/2015 | Liang et al. | |
| 2015/0215308 A1 | 7/2015 | Manolov et al. | |
| 2015/0279132 A1 | 10/2015 | Perotti | |
| 2016/0277923 A1 | 9/2016 | Steffey et al. | |
| 2017/0039373 A1 | 2/2017 | Sasin et al. | |
| 2017/0126667 A1 | 5/2017 | Bishop et al. | |
| 2017/0171191 A1 | 6/2017 | Cignetti et al. | |
| 2017/0279807 A1* | 9/2017 | Bermúdez | H04L 9/3268 |
| 2017/0317837 A1 | 11/2017 | Alrawais et al. | |
| 2017/0338967 A1 | 11/2017 | Lewison et al. | |
| 2018/0083966 A1 | 3/2018 | Zhou et al. | |
| 2018/0102904 A1 | 4/2018 | Lin et al. | |
| 2018/0287804 A1 | 10/2018 | Geisbush | |
| 2019/0026804 A1 | 1/2019 | Yin | |
| 2019/0149342 A1 | 5/2019 | Fynaardt et al. | |
| 2019/0165950 A1 | 5/2019 | Ibrahim | |
| 2019/0166635 A1 | 5/2019 | McColgan et al. | |
| 2019/0347406 A1 | 11/2019 | Lev-Ran | |
| 2019/0349402 A1 | 11/2019 | Shukla et al. | |
| 2019/0356817 A1* | 11/2019 | Bush | H04N 1/00058 |
| 2019/0363895 A1 | 11/2019 | Barr et al. | |
| 2019/0372783 A1 | 12/2019 | Martinez et al. | |
| 2020/0021575 A1 | 1/2020 | Rezvani et al. | |
| 2020/0092095 A1 | 3/2020 | Yang et al. | |
| 2020/0150972 A1 | 5/2020 | Ketkar et al. | |
| 2020/0274718 A1 | 8/2020 | Hwang et al. | |
| 2020/0274862 A1 | 8/2020 | Varvarezis et al. | |
| 2020/0396089 A1 | 12/2020 | Guo et al. | |
| 2021/0034767 A1 | 2/2021 | Free et al. | |
| 2021/0126801 A1 | 4/2021 | Nix | |
| 2021/0152547 A1 | 5/2021 | Barhudarian et al. | |
| 2021/0211307 A1 | 7/2021 | Statia et al. | |
| 2021/0218723 A1 | 7/2021 | Lekov et al. | |
| 2021/0392002 A1 | 12/2021 | Gray et al. | |
| 2021/0409403 A1 | 12/2021 | Lewin et al. | |
| 2021/0409409 A1 | 12/2021 | Palanisamy | |
| 2022/0014522 A1* | 1/2022 | Thomas | H04L 63/02 |
| 2022/0038894 A1 | 2/2022 | Yoon et al. | |
| 2022/0123951 A1 | 4/2022 | Lutz et al. | |
| 2022/0150238 A1 | 5/2022 | Bhalerao | |
| 2022/0239503 A1 | 7/2022 | Mallikarjuna et al. | |
| 2022/0393886 A1 | 12/2022 | Williams et al. | |
| 2023/0007474 A1* | 1/2023 | Ni | H04L 63/029 |
| 2023/0032867 A1 | 2/2023 | Peddada et al. | |
| 2023/0062888 A1* | 3/2023 | Colombano | H04L 9/3263 |
| 2023/0109231 A1 | 4/2023 | Adogla et al. | |
| 2023/0121514 A1 | 4/2023 | Smith | |
| 2023/0208655 A1 | 6/2023 | Statia et al. | |
| 2023/0237155 A1 | 7/2023 | Jacquin et al. | |
| 2023/0291574 A1* | 9/2023 | Held | H04L 9/3263 |
| 2023/0291577 A1 | 9/2023 | Thai et al. | |
| 2023/0401307 A1 | 12/2023 | Pop et al. | |
| 2023/0412397 A1 | 12/2023 | Gollent et al. | |
| 2024/0015508 A1 | 1/2024 | Yoon et al. | |
| 2024/0020373 A1 | 1/2024 | Ivanov et al. | |
| 2024/0031146 A1 | 1/2024 | Marosi-Bauer et al. | |
| 2024/0106886 A1 | 3/2024 | Roy et al. | |
| 2024/0121603 A1 | 4/2024 | Yoon et al. | |
| 2024/0146543 A1 | 5/2024 | Sahoo et al. | |
| 2024/0333640 A1 | 10/2024 | Shevade et al. | |
| 2024/0356763 A1 | 10/2024 | Goldberg et al. | |
| 2024/0388510 A1 | 11/2024 | Madtha et al. | |
| 2025/0030561 A1 | 1/2025 | Long et al. | |
| 2025/0088373 A1 | 3/2025 | Uzun et al. | |
| 2025/0097211 A1 | 3/2025 | Uzun et al. | |
| 2025/0133401 A1 | 4/2025 | Lee et al. | |

FOREIGN PATENT DOCUMENTS

| | | |
|---|---|---|
| EP | 1251670 A2 | 10/2002 |
| EP | 2267970 A2 | 12/2010 |
| EP | 2854349 A1 | 4/2015 |
| EP | 3772208 B1 | 9/2024 |
| KR | 10-2011-0045459 A | 5/2011 |
| WO | 2006/122024 A2 | 11/2006 |
| WO | 2022/121461 A1 | 6/2022 |
| WO | 2022/133026 A1 | 6/2022 |
| WO | 2023/240360 A1 | 12/2023 |
| WO | 2025/059187 A1 | 3/2025 |

OTHER PUBLICATIONS

"About the Expressway", Aug. 17, 2022. pp. 1-12.

"Automated certificate management for TLS certificates", Retrieved from https://docs.servicenow.com/en-us/bundle/utah-it-operations-management/page/product/discovery/concept/automated-cert-requests.html, Retrieved on May 4, 2023, pp. 1-4.

"AWS Certificate Manager FAQs", Retrieved from https://aws.amazon.com/certificate-manager/faqs/, Retrieved on Mar. 24, 2023, pp. 1-17.

"Azure Instance Metadata Service", Retrieved from https://learn.microsoft.com/en-us/azure/virtual-machines/instance-metadata-service?tabs=windows, Mar. 15, 2023, pp. 1-42.

"Cisco Expressway Certificate Creation and Use Deployment Guide", Feb. 23, 2021, pp. 10.

"Deploying the CA bundle iApp", Retrieved from https://www.f5.com/pdf/deployment-guides/f5-ca-bundle-dg.pdf, Dec. 14, 2017, pp. 1-9.

"DigiCert Public Key Infrastructure (PKI) Platform", 2019, pp. 15.

"Get started with Key Vault certificates", Retrieved from https://learn.microsoft.com/en-us/azure/key-vault/certificates/certificate-scenarios, Retrieved on Feb. 1, 2023, pp. 1-6.

"High Availability using Patching and Rolling AP Upgrade on Cisco Catalyst 9800 Wireless Controllers", Copyright 2020, pp. 1-41.

"Manage Certificate Revocation Lists (CRLs)", Jul. 23, 2021, pp. 1-4.

"PKI secrets engine", Retrieved from https://developer.hashicorp.com/vault/docs/secrets/pki, Retrieved on May 4, 2023, pp. 1-3.

(56) References Cited

OTHER PUBLICATIONS

"Planning a certificate revocation list (CRL)", Retrieved from https://docs.aws.amazon.com/privateca/latest/userguide/crl-planning.html, Retrieved on Jul. 28, 2023, p. 11.
"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.
"Release Your App Update in a Staged Rollout", Retrieved from https://developer.amazon.com/docs/app-submission/release-updates-in-staged-rollouts.html, Retrieved on Apr. 27, 2023, pp. 1-18.
"Rotate Security Certificates", Retrieved from https://www.cockroachlabs.com/docs/stable/rotate-certificates, Retrieved on May 4, 2023, pp. 1-6.
"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.
"Staged upgrade", Retrieved from https://www.ibm.com/docs/en/order-management-sw/9.4.0?topic=migrating-staged-upgrade, Mar. 2, 2021, pp. 1-3.
"Troubleshoot SSL certificates", Retrieved from https://cloud.google.com/load-balancing/docs/ssl-certificates/troubleshooting, Retrieved on Mar. 24, 2023, pp. 1-8.
"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.
"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.
"Updating your private CA", Retrieved from https://docs.aws.amazon.com/privateca/latest/userguide/PCAUpdateCA.html, Retrieved on Mar. 24, 2023, pp. 1-4.
"Use self-managed SSL certificates", Retrieved from https://cloud.google.com/load-balancing/docs/ssl-certificates/self-managed-certs, Aug. 15, 2023, p. 13.
"vSphere Security", vmware, Update 3, Mar. 21, 2023, pp. 1-426.
"Working with Hosts", Retrieved from https://docs.cloudstack.apache.org/projects/archived-cloudstack-administration/en/latest/hosts.html, Retrieved on Mar. 24, 2023, pp. 1-7.
Atutxa et al., "Improving efficiency and security of IIoT communications using in-network validation of server certificate", Computers in Industry, vol. 144, Jan. 2023, 103802, pp. 30.
Bigelow S.J., "Rolling deployment", Retrieved from https://www.techtarget.com/searchitoperations/definition/rolling-deployment, Jan. 2023, pp. 4.
Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.
Ghanmi et al., "A Secure Data Storage in Multi-cloud Architecture Using Blowfish Encryption Algorithm", Advanced Information Networking and Applications, Mar. 2022, pp. 398-408.
Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.
Manjusha R. et al., "Secure Authentication and Access System for Cloud Computing Auditing Services Using Associated Digital Certificate", Indian Journal of Science and Technology, vol. 8 (S7), Apr. 2015, pp. 220-227.
Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, pp. 10.
Rowley J., "Google's Moving Forward Together Proposals for Root CA Policy: Rotating Icas More Frequently", Retrieved from https://www.digicert.com/blog/googles-moving-forward-together-proposals-for-root-ca-policy, Mar. 22, 2023, pp. 1-11.
Subhayu, "Different Phases of a Certificate Lifecycle Management Process for a secure WPA2-Enterprise network", Certificate Lifecycle Management Oct. 6, 2022, Pp. 16.
Ylonen et al., "Security of Automated Access Management Using Secure Shell (SSH)", NISTIR 7966 (Draft), Aug. 2014, pp. 43.
"What is Certificate Lifecycle Management", Retrieved from https://www.encryptionconsulting.com/different-phases-of-a-certificate-lifecycle-management-process/, Aug. 1, 2024, pp. 1-12.

* cited by examiner

AUTHENTICATING CERTIFICATE BUNDLES WITH ASYMMETRIC KEYS

TECHNICAL FIELD

The present disclosure relates to asymmetric cryptography. More particularly, the present disclosure relates to the use of asymmetric keys to digitally sign and validate certificate bundles that include certificate authority certificates.

BACKGROUND

A virtual cloud network includes network entities that communicate with one another. Communications between network entities may be performed in accordance with a security protocol whereby network entities authenticate one another by presenting a digital certificate. When a network entity presents a valid digital certificate to another network entity, the other network entity can trust that it is communicating with the network entity, as opposed to some unknown entity, based on a trust relationship with the CA that issued the digital certificate.

A digital certificate may be issued to a network entity by a CA. The digital certificate may include a digital signature generated using a private key of the CA that issued the digital certificate. The digital signature can be validated using CA certificate of the CA that includes a public key corresponding to the private key. Various CA certificates that may be utilized to validate digital certificates issued to various network entities may be included in a certificate bundle. The certificate bundle may be distributed to network entities throughout a virtual cloud network. For example, a certificate bundle may be installed when initializing the virtual cloud network and/or when initializing various network entities on the virtual cloud network. Additionally, a certificate bundle may be updated or replaced from time-to-time, for example, to make new CA certificates available to the network entities and/or to remove old CA certificates.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
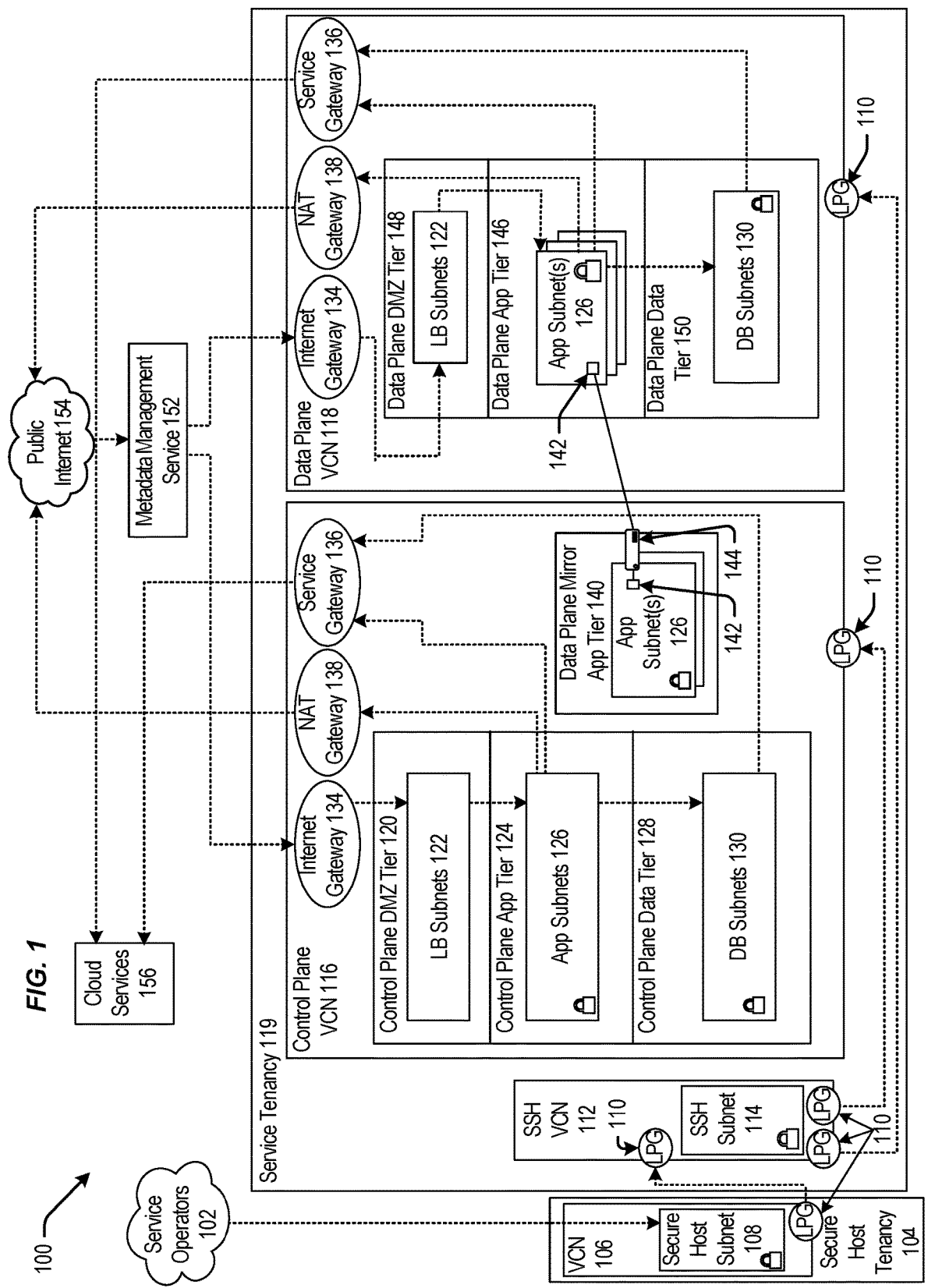
FIGS. 1-4 are block diagrams illustrating patterns for implementing a cloud infrastructure as a service system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CLOUD COMPUTING TECHNOLOGY
3. COMPUTER SYSTEM
4. ARCHITECTURAL OVERVIEW
5. AUTHENTICATING NETWORK ENTITIES
6. EXAMPLE CERTIFICATE BUNDLE DISTRIBUTION PROCESS
7. VALIDATING CERTIFICATE AUTHORITY DATASETS
8. PROVISIONING CLOUD RESOURCE INSTANCES
9. RETRIEVING AND INSTALLING CERTIFICATE BUNDLES
10. MISCELLANEOUS; EXTENSIONS

1. General Overview

One or more embodiments validate a certificate authority (CA) dataset associated with a virtual cloud network (VCN) using a global public key that corresponds to a global private key used by a key management service hosted on a separate VCN to digitally sign the CA dataset. The CA dataset may include a set of one or more CA certificates. When a new CA dataset is added to a certificate repository on an ancillary VCN, a digital signature manager on the ancillary VCN transmits the CA dataset to the key management service hosted on a home VCN. The key management service digitally signs the CA dataset using a global private key, and transmits the digital signature of the CA dataset to the digital signature manager. The digital signature manager stores the digital signature in the certificate repository in a data structure that associates the digital signature with the CA dataset. The CA dataset may then be distributed to network entities, such as cloud resource instances, on the ancillary VCN, and the network entities may validate the CA dataset using a global public key corresponding to the global private key prior to installing the one or more CA certificates in the CA dataset.

In one example, the CA dataset may be distributed to network entities in connection with an initial provisioning of a VCN and/or in connection with an initial provisioning of one or more network entities associated with the VCN. Advantageously, the digital signature of the CA dataset using the global private key may serve as a source of trust for the one or more CA certificates in the CA dataset. In one example, the digital signature of the CA dataset may provide an alternative to a "trust on first use" anti-security model. For example, the key management service on the home VCN may generally be regarded as a trusted network entity, and the validation of the CA dataset using the global public key provides assurance that the CA dataset from which the one or more CA certificates are being installed is identical to the CA dataset that was digitally signed by the key management service using the global private key.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
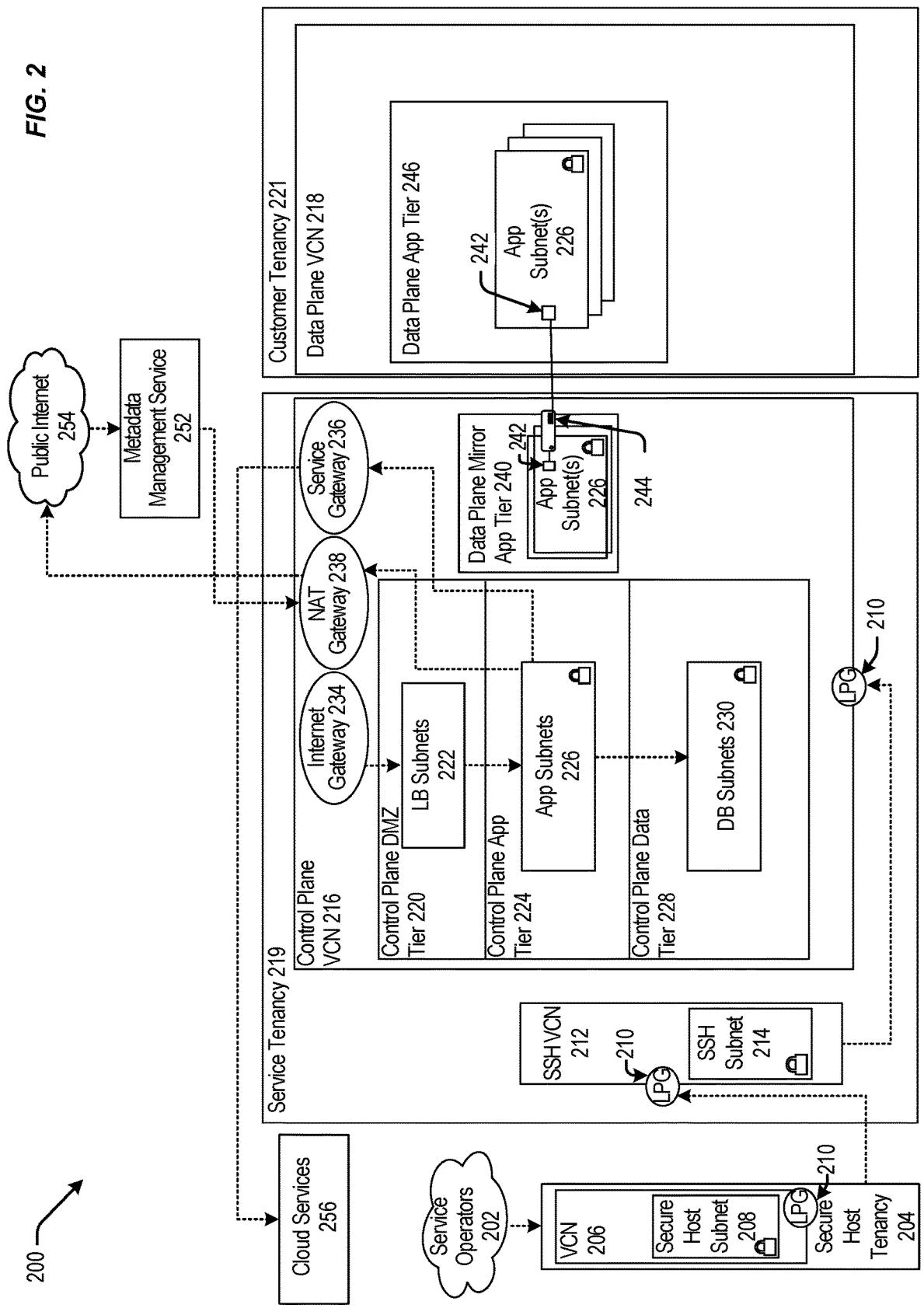

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If P a e 12 a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
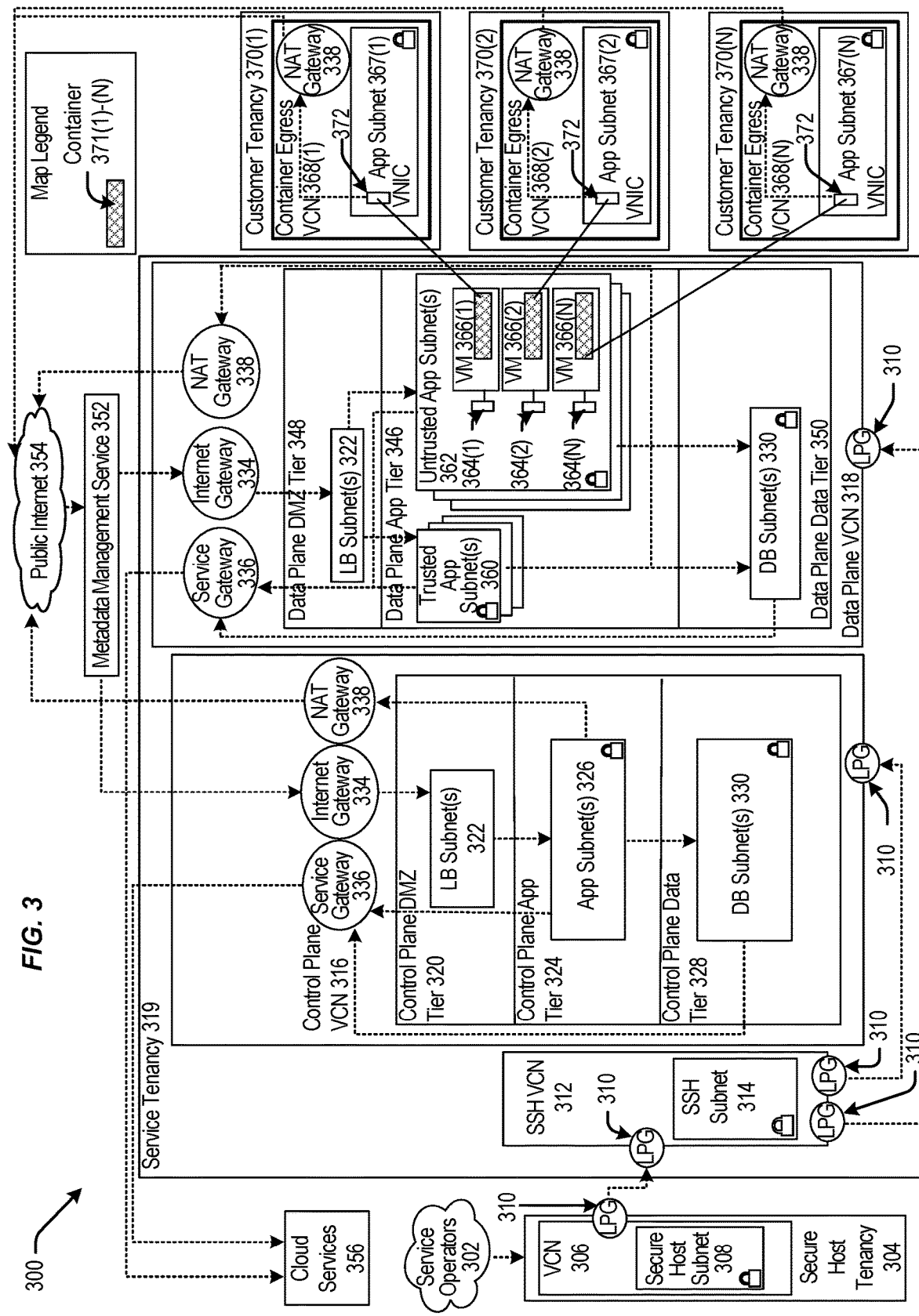

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
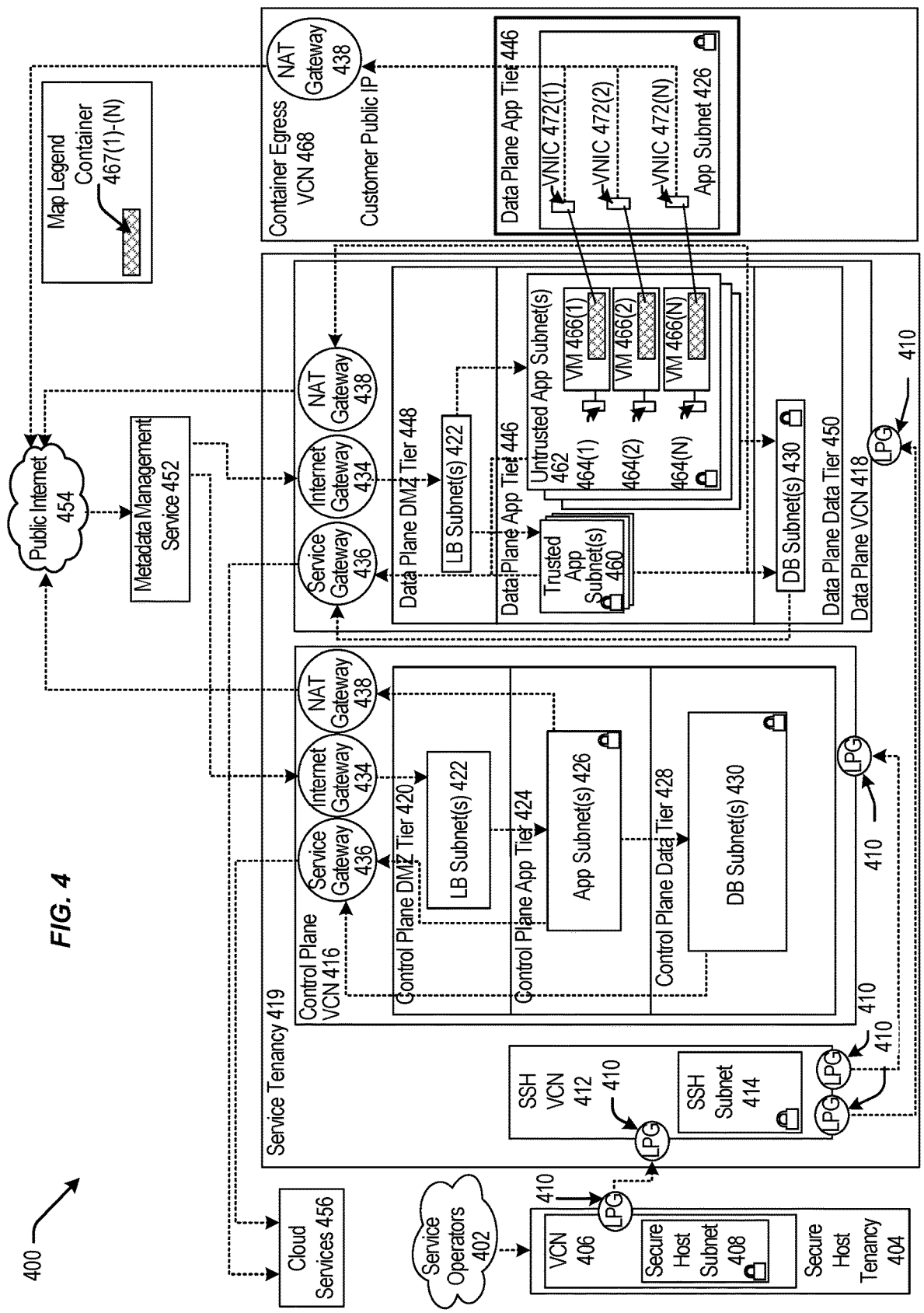

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), P a e 16 and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by P a e 18 a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the P a e 21 tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
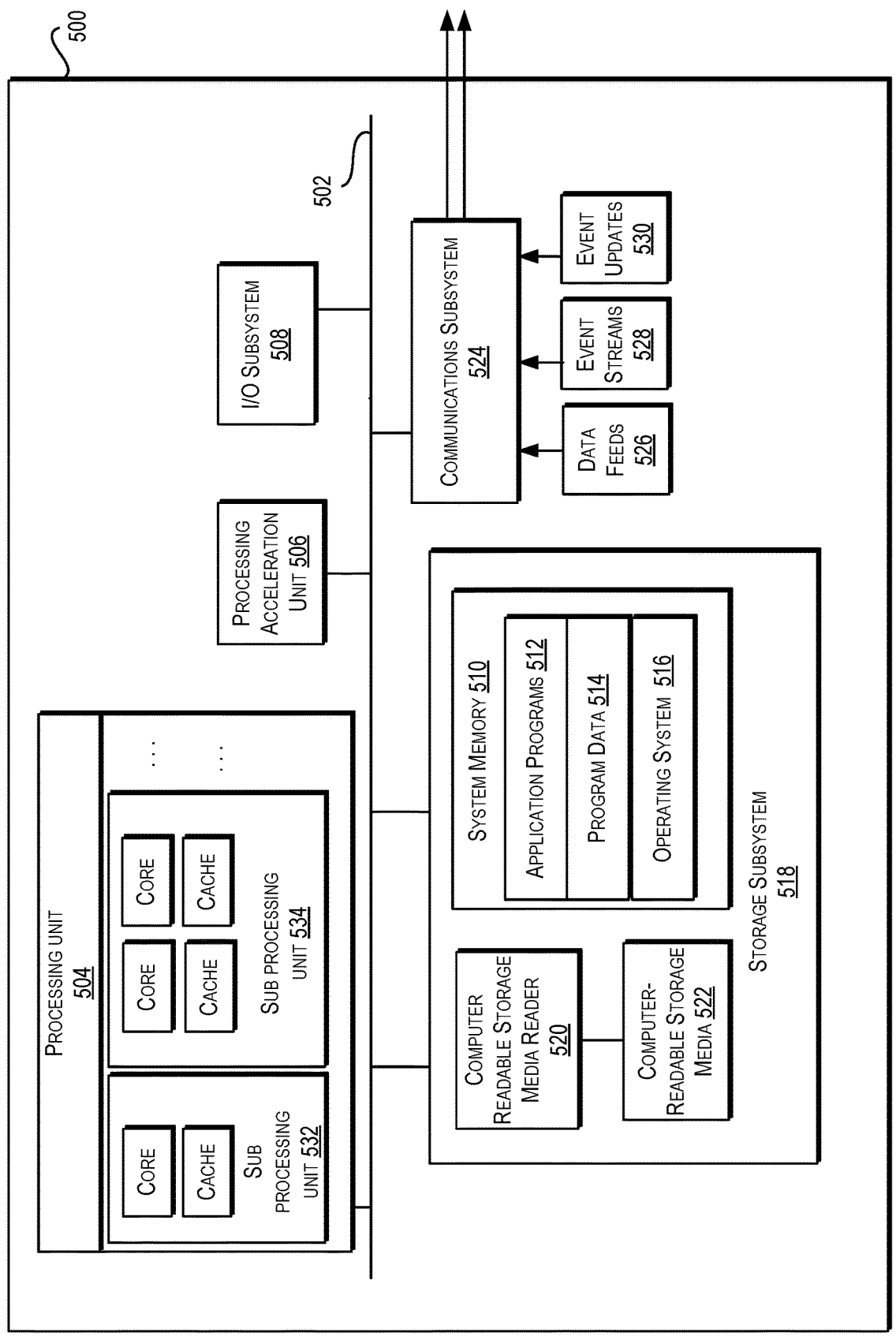
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Architectural Overview

Figure 6A:
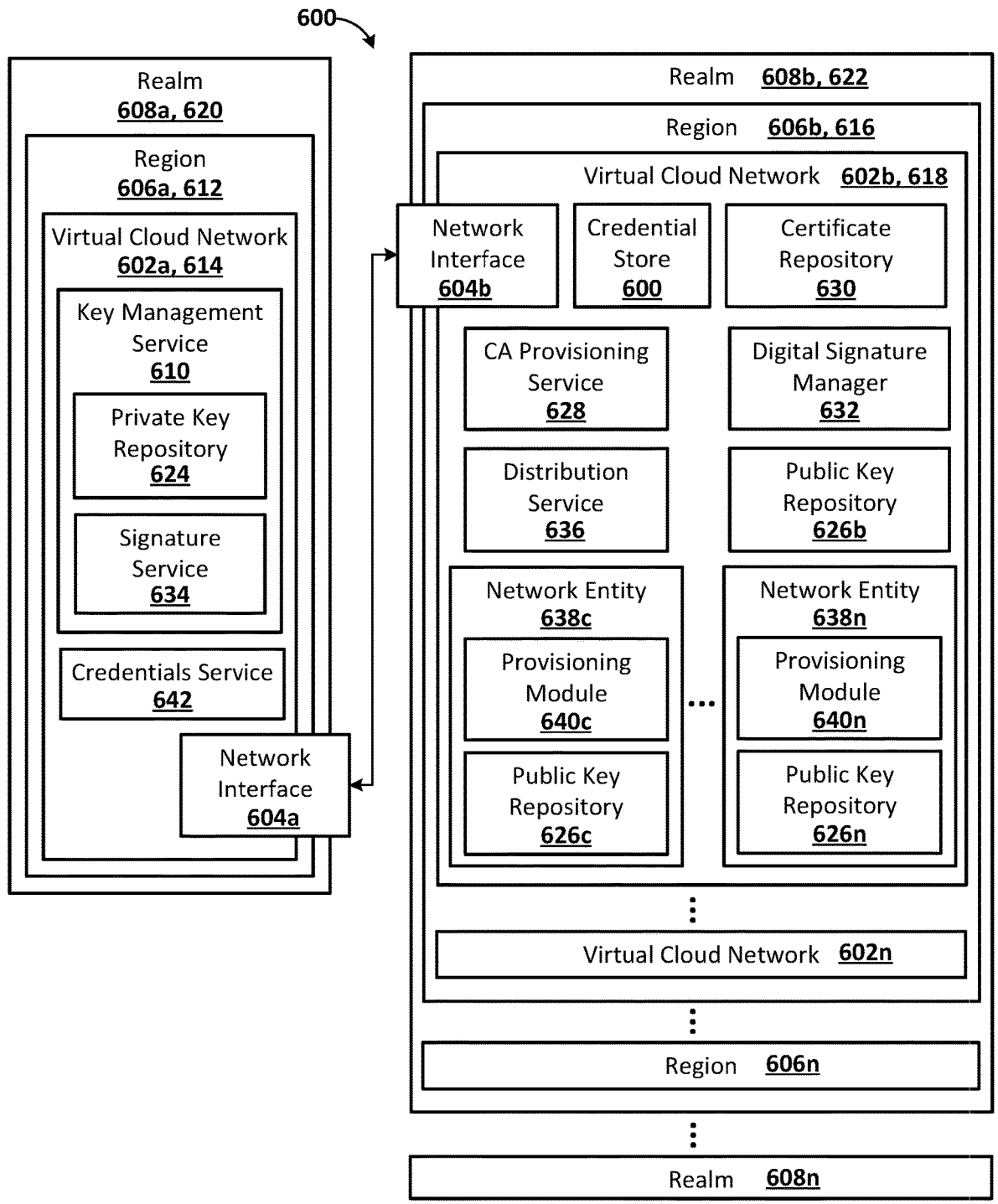
FIGS. 6A and 6B illustrate features of an example system in accordance with one or more embodiments.
Figure 6B:
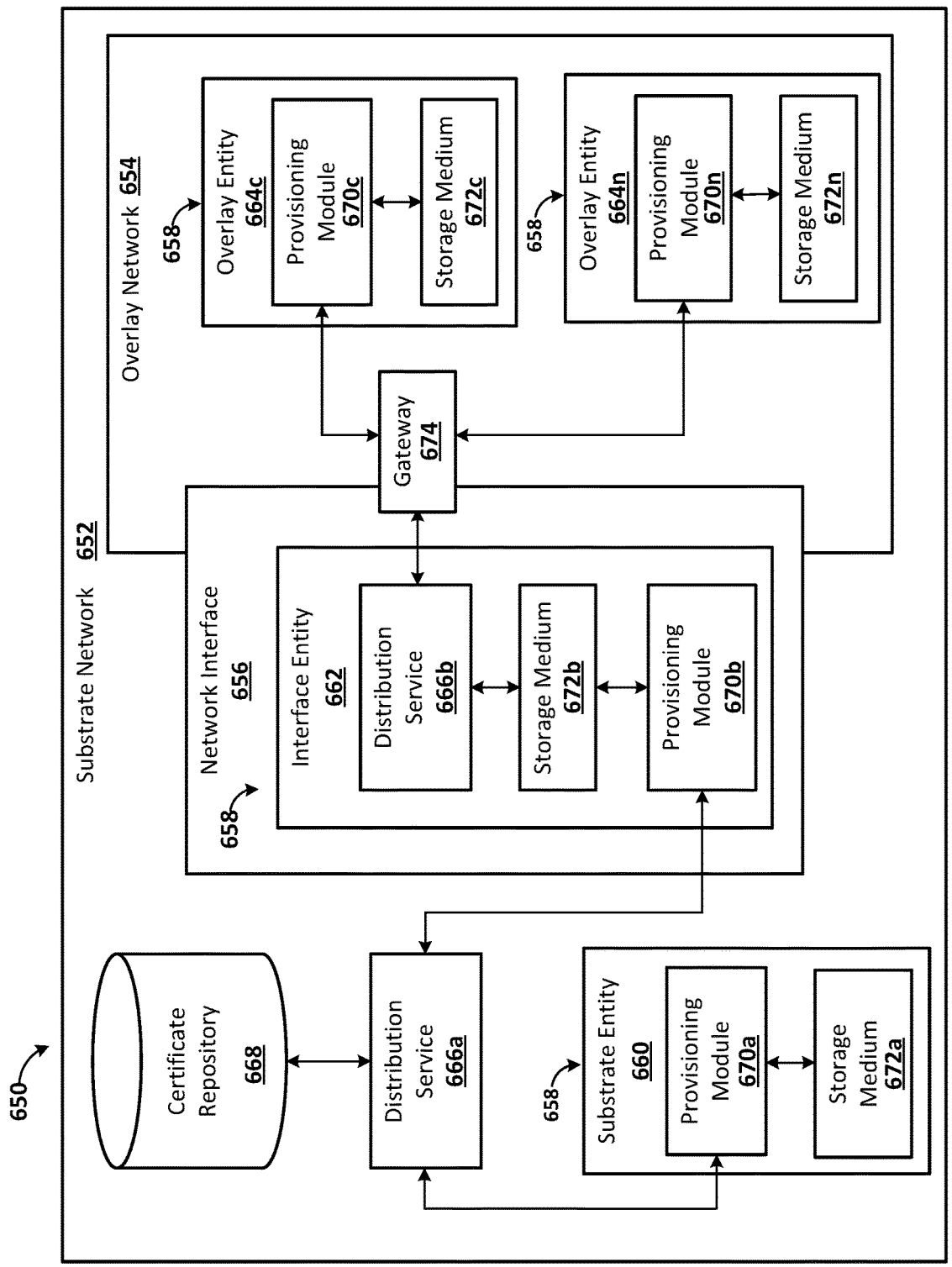

FIGS. 6A and 6B illustrate one example of a system 600 in accordance with one or more embodiments. The system 600 described with reference to FIGS. 6A and 6B may perform operations associated with validating CA datasets using asymmetric keys as described herein. The system 600 may also perform operations associated with distributing certificate bundles to network entities and/or provisioning cloud resource instances, as respectively described herein.

As illustrated in FIG. 6A, the system 600 may include a plurality of virtual cloud networks 602, such as virtual cloud network 602a, virtual cloud network 602b, and virtual cloud network 602n. The plurality of virtual cloud networks 602 may be separate networks in a cloud computing environment. For example, each separate virtual cloud network 602 may represent a logically isolated network in the cloud computing environment. Additionally, or in the alternative, one or more of the separate virtual cloud networks 602 may be physically isolated from at least one of the other virtual cloud networks 602. In one example, a plurality of virtual cloud networks 602 that are logically isolated may share underlying physical infrastructure components, such as servers, switches, or routers. Separate virtual cloud networks 602, such as virtual cloud networks 602 that are logically isolated from one another, may operate as independent networks while sharing underlying physical infrastructure components. Each separate virtual cloud network 602 may include its own set of resources, IP address range, and/or security policies relative to other virtual cloud networks 602 in the cloud computing environment. Network entities on separate virtual cloud networks 602 may communicate with one another to varying extents, for example, in accordance with applicable security protocols.

In one example, separate virtual cloud networks 602 may be differentiated from one another based on a range of non-overlapping IP addresses respectively assigned to the separate virtual cloud networks 602. Additionally, or in the alternative, separate virtual cloud networks 602 may be differentiated from one another based on having separate cloud resources, such as a s separate set of virtual machines, separate control planes, separate data planes, and/or separate databases. Additionally, or in the alternative, separate virtual cloud networks 602 may be differentiated from one another based on having separate firewalls, security protocols, security groups, or network security lists.

The virtual cloud networks 602 may respectively include a network interface 604 configured to allow communications between the virtual cloud networks 602. For example, as shown in FIG. 6A, virtual cloud network 602a may include network interface 604a, and virtual cloud network 602b may include network interface 604b. A network interface 604 associated with a virtual cloud network 602 may include one or more connectivity mechanisms. In one example, a network interface 604 may include a proxy server. The proxy server may act as a gateway between virtual cloud networks 602. Additionally, or in the alternative, a network interface 604 may be configured to provide network peering. As used herein, the term "network peering" refers to a direct, private connection between separate networks, allowing them to communicate as if they were part of the same network. As examples, network peering may include virtual peering (e.g., for communication within the same cloud region), VCN peering (e.g., for communication between separate virtual cloud networks within the same cloud provider's infrastructure), and/or VPN peering (e.g., for communications across different geographic locations or different cloud computing environments).

In one example, the system 600 may include a plurality of regions 606, such as region 606a, region 606b, and region 606n. Each region 606 may include one or more virtual cloud networks 602. For example, region 606a may include virtual cloud network 602a and region 606b may include virtual cloud network 602b and virtual cloud network 602n. In one example, the system 600 may include a plurality of realms 608, such as realm 608a, realm 608b, and realm 608n. Each realm 608 may include one or more regions 606. For example, realm 608a may include region 606a, and realm 608b may include region 606b and region 606n. As used herein, the term "region" refers to a set of one or more interconnected data centers upon which a virtual cloud network is deployed. In one example, a region may correspond to a physical geographic area. In one example, a region may correspond to multiple physical geographic areas and/or a portion of a physical geographic area. As used herein, the term "realm" refers to a distinct deployment of an IaaS system infrastructure. In one example, regions within a realm may communicate with one another by way of a network interface 604, such as by way of network peering. In one example, regions from different realms may communicate with one another by way of a network interface 604, such as by way of network peering.

Referring further to FIG. 6A, a first virtual cloud network, such as virtual cloud network 602a, may include a key management service 610. The key management service 610 may be configured to digitally sign CA datasets that are transmitted to the key management service 610 from other virtual cloud networks 602, such as virtual cloud network 602b and/or virtual cloud network 602n. Upon having digitally signed a CA dataset, the key management service 610 may transmit a digital signature of the CA dataset to the other virtual cloud network 602 from which the CA dataset was transmitted.

In one example, the key management service 610 may be hosted on a virtual cloud network 602 within a home region 612. Additionally, or in the alternative, the virtual cloud network 602 on which the key management service 610 is hosted may be a home VCN 614. In one example, CA datasets may be transmitted to the key management service 610 from one or more virtual cloud networks 602 associated with an ancillary region 616. Additionally, or in the alternative, the virtual cloud network 602 from which a CA dataset is transmitted to the key management service 610 may be an ancillary VCN 618.

As used herein, the term "home region" refers to a region 606 of a cloud computing environment from which a virtual cloud infrastructure is deployed and/or managed. As used herein, the term "home VCN" refers to a virtual cloud network 602 within a home region. In one example, virtual cloud infrastructure may be deployed and/or managed from a home VCN. A realm 608 that includes a home region 612 may sometimes be referred to as a home realm 620. A home region 612 and/or a home VCN 614 may serve as an initial location for deploying cloud computing resources and services, such as additional regions 606 and/or additional virtual cloud networks 602. In one example, CA resources and/or services may be deployed and/or managed from the home region 612. The CA resources and/or services may include issuing digital certificates and/or generating asymmetric key pairs, such as asymmetric key pairs associated with digital certificates and/or asymmetric key pairs associated with validating CA datasets. The key management service 610 may represent a portion of the CA resources and/or services deployed and/or managed in the home region.

As used herein, the term "ancillary region" refers to a region 606 of a cloud computing environment that utilizes and/or relies on a home region 612 and/or a home VCN 614 for deployment and/or management of at least a portion of a virtual cloud infrastructure with respect to one or more virtual cloud networks 602 within the region 606. As used herein, the term "ancillary VCN" refers to a virtual cloud network 602 within an ancillary region 616. In one example, an ancillary VCN 618 may utilize and/or rely on a home region 612 for deployment and/or management of at least a portion of a virtual cloud infrastructure. A realm 608 that includes an ancillary region 616 may sometimes be referred to as an ancillary realm 622.

The key management service 610 may include a private key repository 624. The private key repository 624 may include one or more global private keys. The one or more global private keys may be generated by the key management service 610. Each global private key may be associated with a corresponding global public key. For each global private key, a corresponding global public key may be stored in one or more public key repositories 626 associated with a virtual cloud network 602, such as an ancillary VCN 618. For example, various network entities associated with an ancillary VCN 618 may include a public key repository 626 that includes one or more global public keys respectively associated with a corresponding global private key in the private key repository 624. The one or more global public keys may be transmitted from the home VCN 614 to the ancillary VCN 618 for storage in the one or more public key repositories 626. Additionally, or in the alternative, the one or more global public keys may be included in a configuration file and/or in an operating system image for the ancillary VCN 618, such as a configuration file and/or an operating system image for various network entities associated with the ancillary VCN 618.

In one example, a private key repository 624 may include any type of storage unit and/or device (e.g., a file system, database, collection of tables, or any other storage mechanism) for storing data. Further, a private key repository 624 may include multiple different storage units and/or devices. The multiple different storage units and/or devices may or may not be of the same type or located at the same physical site. Further, a private key repository 624 may be implemented or executed on the same computing system as the key management service 610. Additionally, or in the alternative, a private key repository 624 may be implemented or executed on a computing system separate from the key management service 610. The certificate repository 630 may be communicatively coupled to the key management service 610 via a direct connection or via a network.

In one example, a public key repository 626 may include any type of storage unit and/or device (e.g., a file system, database, collection of tables, or any other storage mechanism) for storing data. Further, a public key repository 626 may include multiple different storage units and/or devices. The multiple different storage units and/or devices may or may not be of the same type or located at the same physical site. Further, a public key repository 626 may be implemented or executed on the same computing system as the key management service 610. Additionally, or in the alternative, a public key repository 626 may be implemented or executed on a computing system separate from the key management service 610. The certificate repository 630 may be communicatively coupled to the key management service 610 via a direct connection or via a network.

The CA datasets may include one or more CA certificates. For example, a CA dataset may include a certificate bundle that includes one or more CA certificates. Additionally, or in the alternative, a CA datasets and/or a certificate bundle may include other data associated with the CA certificates, such as cryptographic keys, certificate revocation lists, and/or configuration files. When a set of one or more CA certificates is being deployed, such as by an ancillary VCN 618, prior to deploying the one or more CA certificates, the ancillary VCN 618 may transmit a CA dataset that includes the one or more CA certificates to the key management service 610. The key management service 610 may digitally sign the CA dataset using a global private key and transmit a digital signature of the CA dataset to the ancillary VCN 618. The CA dataset may then be validated using a global public key corresponding to the global public key that was used to digitally sign the CA dataset. In one example, various network entities associated with the ancillary VCN 618 may validate the CA dataset prior to installing the one or more CA certificates in the CA dataset. Additionally, or in the alternative, the CA dataset may be validated prior to being distributed to network entities associated with the ancillary VCN 618.

Referring further to FIG. 6A, a virtual cloud network 602b, such as an ancillary VCN 618, may include a CA provisioning service 628 and a certificate repository 630. The CA provisioning service 628 may provide CA certificates for use in the virtual cloud network 602b. In one example, the CA provisioning service 628 may serve as a CA for the virtual cloud network 602b. The CA provisioning service 628 may generate CA certificates and/or certificate bundles. Additionally, or in the alternative, the CA provisioning service may obtain CA certificates and/or certificate bundles from a CA, such as from a CA associated with the home VCN 614. The CA provisioning service 628 may store CA certificates and/or certificate bundles in the certificate repository 630.

A certificate repository 630 may include any type of storage unit and/or device (e.g., a file system, database, collection of tables, or any other storage mechanism) for storing data. Further, a certificate repository 630 may include multiple different storage units and/or devices. The multiple different storage units and/or devices may or may not be of the same type or located at the same physical site. The certificate repository 630 may share one or more storage units with the public key repository 626b. Additionally, or in the alternative, the certificate repository 630 may include one or more storage units that differ from one or more storage units of the public key repository 626b. Further, the certificate repository 630 and/or the public key repository 626b may be implemented or executed on the same computing system as the CA provisioning service 628, the digital signature manager 632, and/or the distribution service 636. Additionally, or in the alternative, the certificate repository 630 and/or the public key repository 626b may be implemented or executed on a computing system separate from the CA provisioning service 628, the digital signature manager 632, and/or the distribution service 636. The certificate repository 630 and/or the public key repository 626b may be communicatively coupled to the CA provisioning service 628, the digital signature manager 632, and/or the distribution service 636 via a direct connection or via a network.

In one example, as shown in FIG. 6A, a virtual cloud network 602b, such as an ancillary VCN 618, may include a digital signature manager 632. The digital signature manager may determine that the certificate repository 630 includes one or more CA certificates and/or one or more certificate bundles that have yet to be associated with a digital signature from the key management service 610. CA certificates that have yet to be associated with a digital signature from the key management service 610 may sometimes be referred to as a "new CA certificates." Certificate bundles that have yet to be associated with a digital signature from the key management service 610 may sometimes be referred to as a "new certificate bundles." The digital signature manager 632 may detect one or more new CA certificates in the certificate repository 630. The one or more new CA certificates may be included in a certificate bundle stored in the certificate repository 630. Additionally, or in the alternative, the one or more new CA certificates may be stored individually in the certificate repository.

Upon having detected one or more new CA certificates and/or one or more new certificate bundles in the certificate repository 630, the digital signature manager 632 may transmit a CA dataset to the key management service 610 that includes the one or more CA certificates and/or the one or more new certificate bundles. The key management service 610 may receive the CA dataset from the digital signature manager 632, and the key management service 610 may digitally sign the CA dataset with a global private key. Upon having digitally signed the CA dataset, the key management service 610 may transmit the digital signature of the CA dataset to the digital signature manager 632. The digital signature manager 632 may receive the digital signature of the CA dataset from the key management service 610, and the digital signature manager 632 may store the digital signature in the certificate repository 630 in a data structure that associates the digital signature with the CA dataset.

In one example, the key management service 610 may include a signature service 634 configured to digitally sign CA datasets. The signature service 634 may digitally sign a CA dataset at least by applying a hash function to the CA dataset to generate a hash value that uniquely represents the CA dataset. The hash value may then be encrypted using the global private key to provide a digital signature that is a cryptographic representation of the hash value encrypted with the global private key. In one example, the digital signature of the CA dataset may be appended to the CA dataset, and the key management service 610 may transmit the CA dataset with the appended digital signature to the digital signature manager 632. Alternatively, the key management service 610 may transmit the digital signature of the CA dataset to the digital signature manager 632 without including the CA dataset, for example, as the digital signature manager may already have access to the CA dataset in the certificate repository 630.

In one example, the digital signature manager 632 may associate a digital signature received from the key management service 610 with a CA dataset in the certificate repository 630 based on one or more identifying indicia, such as an identification number or a timestamp associated with the CA dataset. Additionally, or in the alternative, the digital signature manager 632 may validate a digital signature received from the key management service 610 using a global public key corresponding to the global private key used by the key management service 610 to digitally sign the CA dataset.

The digital signature manager 632 may validate the digital signature at least by computing a hash value of the CA dataset using the same hash function that was used by the key management service 610 when digitally signing the CA dataset. The digital signature manager 632 may then decrypt the digital signature using the global public key to obtain a decrypted hash value. The digital signature manager 632 may compare the decrypted hash value to the hash value of the CA dataset. When the decrypted hash value matches the hash value of the CA dataset, this means that the CA dataset that was digitally signed by the key management service 610 is identical to the CA dataset with respect to which the digital signature manager 632 computed the hash value. Thus, the digital signature manager 632 may determine that the digital signature of the CA dataset is valid at least when the decrypted hash value matches the hash value of the CA dataset. The digital signature manager 632 may validate the digital signature received from the key management service 610, for example, prior to storing the digital signature in the data structure of the certificate repository 630 that associates the digital signature with the CA dataset. In one example, the digital signature manager 632 may reject a digital signature in the event of a mismatch between the decrypted hash value and the hash value of the CA dataset. The digital signature manager 632 may request a new digital signature in the event of a mismatch between the decrypted hash value and the hash value of the CA dataset.

Referring further to FIG. 6A, a virtual cloud network 602b, such as an ancillary VCN 618, may include a distribution service 636. The distribution service 636 may obtain CA datasets from the certificate repository 630 and transmit the CA datasets to various network entities 638 associated with the virtual cloud network 602b. The distribution service 636 may transmit CA datasets to the network entities 638 that have been digitally signed by the key management service 610. In one example, the distribution service 636 may identify a CA dataset in the certificate repository 630 that is associated with a digital signature, and the distribution service 636 may transmit, or push, the CA dataset and the digital signature of the CA dataset to one or more network entities 638. Additionally, or in the alternative, the distribution service 636 may receive a request from a network entity 638 for the distribution service 636 to provide one or more new CA certificates and/or one or more new certificate bundles to the network entity 638. The distribution service 636 may transmit the CA dataset and the digital signature of the CA dataset to the network entity 638 in response to the request.

As shown in FIG. 6A, the virtual cloud network 602v, such as the ancillary VCN 618, may include a plurality of network entities 638, such as network entity 638c and network entity 638n. Each network entity 638 may include a provisioning module 640 and a public key repository 626. For example, network entity 638c may include provisioning module 640c and public key repository 626c, and network entity 638n may include provisioning module 640n and public key repository 626n. The public key repository 626 of a network entity 638, such as public key repository 626c of network entity 638c, may include one or more global public keys. Each global public key in the public key repository 626 of a network entity 638 may correspond to a global private key utilized by the key management service 610 to digitally sign CA datasets.

In one example, the one or more global public keys may be included in a configuration file and/or in an operating system image for the network entity 638. Additionally, or in the alternative, the one or more global public keys may be transmitted to a network entity 638, for example, by the distribution service 636. For example, the distribution service 636 may obtain one or more global public keys from public key repository 626b. In one example, public key repository 626b may be associated with the virtual cloud network 602b. Additionally, or in the alternative, public key repository 626b may be associated with the CA provisioning service 628, the certificate repository 630, and/or the digital signature manager 632. The distribution service 636 may transmit the one or more global public keys obtained from public key repository 626b to one or more network entities, such as to the provisioning module 640 of the respective network entity 638. The provisioning module 640 may install the one or more global public keys in the public key repository 626 of the network entity 638. For example, the distribution service 636 may transmit one or more global public keys to provisioning module 640c of network entity 638c, and provisioning module 640c may install one or more global public keys in public key repository 626c.

The provisioning module 640 of a network entity 638 may perform an initial provisioning of the network entity 638. Additionally, or in the alternative, the provisioning module 640 may perform periodic updates to the network entity 638. An initial provisioning and/or a periodic update of a network entity 638 may include obtaining a CA dataset and a digital signature of the CA dataset from the distribution service 636 and installing one or more CA certificates and/or a certificate bundle that includes one or more CA certificates in the storage medium associated with the network entity 638. The provisioning module 640 may request a CA dataset from the distribution service 636. The request for a CA dataset may be associated with an initial provisioning of the network entity 638 or a periodic update to the network entity 638. The distribution service 636 may distribute a CA dataset to the provisioning module 640 responsive to a request from the provisioning module 640. Additionally, or in the alternative, the distribution service may push CA datasets to the provisioning module 640, for example, without receiving a request from the provisioning module 640.

In one example, the provisioning module 640 may validate a CA dataset, for example, prior to installing the CA dataset in the storage medium, using a global public key corresponding to the global private key that was used by the key management service 610 to digitally sign the CA dataset.

The provisioning module 640 may validate the CA dataset at least by computing a hash value of the CA dataset using the same hash function that was used by the key management service 610 when digitally signing the CA dataset. The provisioning module 640 may then decrypt the digital signature using the global public key to obtain a decrypted hash value. The provisioning module 640 may compare the decrypted hash value to the hash value of the CA dataset. When the decrypted hash value matches the hash value of the CA dataset, this means that the CA dataset that was digitally signed by the key management service 610 is identical to the CA dataset with respect to which the provisioning module 640 computed the hash value. Thus, the provisioning module 640 may determine that the CA dataset is valid at least when the decrypted hash value matches the hash value of the CA dataset. The provisioning module 640 may validate the CA dataset, for example, prior to installing the CA dataset in the storage medium associated with the network entity 638. In one example, the provisioning module 640 may reject a CA dataset in the event of a mismatch between the decrypted hash value matches the hash value of the CA dataset. The digital signature manager 632 may request a new digital signature in the event of a mismatch between the decrypted hash value and the hash value of the CA dataset.

Referring further to FIG. 6A, in one example, virtual cloud network 602a, such as a home VCN 614, may include a credential service 642. The credential service 642 may provide a credential, such as a certificate or a token, to the digital signature manager 632. The digital signature manager 632 may have authorization to request for the digital signature manager 632 to digitally sign CA datasets based at least on the credential. The digital signature manager 632 may provide the credential to the key management service 610 in connection with requests for the key management service 610 to digitally sign a CA dataset. The key management service 610 may validate the credential prior to digitally signing a CA dataset. The key management service 610 may reject a request to digitally sign a CA dataset if the credential is invalid.

Referring now to FIG. 6B, the system 600 is further described with reference to an example virtual cloud network 650. The virtual cloud network 650 may include the virtual cloud network 602b, such as ancillary VCN 618, described with reference to FIG. 6A. As shown in FIG. 6B, the virtual cloud network 650 may include a substrate network 652, an overlay network 654, and a network interface 656 that provides communication between the substrate network 652 and the overlay network 654. The system may include a plurality of network entities 658 located throughout the virtual cloud network. The plurality of network entities 658 may correspond to the plurality of network entities 638 described with reference to FIG. 6A. A network entity 658 may reside on the substrate network 652, the overlay network 654, or the network interface 656. A network entity 658 may be implemented in hardware and/or software in association with the virtual cloud network, such as a node, a host, an agent, a service, a component, an endpoint, or other element. The plurality of network entities 658 may include one or more substrate entities 660, one or more interface entities 662, and/or one or more overlay entities 664.

As used herein, the term "substrate entity" refers to a network entity 658 implemented in a substrate network 652. As used herein, the term "substrate network" refers to a physical network infrastructure. The substrate network generally provides a foundation of a virtual cloud network. The substrate network 652 may include physical network devices, such as routers, switches, network links, and other networking components. The substrate network 652 may generally provide the basic connectivity and transport capabilities necessary for data transmission within and between data centers.

The one or more substrate entities 660 may include substrate hosts, routers, firewall appliances, load balancers, storage devices, and/or substrate services. A substrate host may include an endpoint within the substrate network 652, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity 660 may include a combination of hardware and software. In one example, the one or more substrate entities 660 may include one or more substrate hosts, and/or one or more substrate services. In one example, a substrate host may include a bare metal host. In one example, a substrate service may include a firmware service. The substrate entities 660 may communicate with one another, and/or with other network entities 658, using logical network addresses assigned within the overlay network.

As used herein, the term "network interface" refers to a communication interface between a substrate network and an overlay network, such as a network interface card, a smartNIC, or the like. A network interface 656 may include one or more interface entities 662, such as a node on the network interface 656, or an interface service executing or executable on the network interface 656. A node on the network interface 656 may include a programmable hardware component, a memory component, or a gateway component. In one example, a network interface 656 may include a network interface card, such as a smartNIC. Additionally, or in the alternative, a network interface 656 may include a node or an endpoint on a network interface card or smartNIC.

A gateway component may provide connectivity between the substrate network 652 and the network interface 656, and/or between the network interface 656 and the overlay network 654. For example, a gateway component may enable communication between overlay entities 664 and substrate entities 660. Additionally, or in the alternative, a gateway component may provide connectivity between the overlay network 654 and external networks, such as the internet or other networks outside the overlay network. For example, an overlay gateway may enable communication between overlay entities 664 and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity 658 implemented on an overlay network 654. The overlay network 654 may include a plurality of overlay entities 664. The plurality of overlay entities 664 may include overlay hosts, overlay services, subnets, overlay controllers, and/or overlay clients. In one example, the overlay network 654 may include a plurality of overlay entities 664, such as overlay entity 664c and overlay entity 664n. In one example, an overlay entity 664 may include an overlay host. Additionally, or in the alternative, an overlay entity 664 may include an overlay service. The plurality of overlay entities 664 may communicate with one another using logical network addresses assigned within the overlay network 654.

An overlay host may include an endpoint within the overlay network 654, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

Referring further to FIG. 6B, the system 600 may include at least one distribution service 666 and at least one certificate repository 668. The at least one distribution service 666 may correspond to the distribution service 636 described with reference to FIG. 6A. A distribution service 666 may be configured to distribute certificate bundles that include CA certificates to at least some of the network entities 658. The certificate bundles may be housed in a certificate repository 668 accessible by the distribution service 636. The certificate repository 668 may correspond to the certificate repository 630 described with reference to FIG. 6A. The distribution service 666 may retrieve a certificate bundle from the certificate repository 668 and transmit the certificate bundle to one or more of the network entities 658. In one example, a distribution service 666 may be configured to transition, such as concurrently transition, a plurality of network entities through a series of phases of a certificate bundle distribution process for distributing a new set of one or more CA certificates to the plurality of network entities 658 for use in a certificate authentication process.

In one example, a first distribution service 666a may be implemented on the substrate network 652. A distribution service 666 implemented on the substrate network 652 may be communicatively coupled with one or more substrate entities 660 on the substrate network 652. Additionally, or in the alternative, a distribution service 666 implemented on the substrate network 652 may be communicatively coupled with the network interface 656, such as with one or more interface entities 662 on the network interface 656. For example, the first distribution service 666a may obtain certificate bundles from the certificate repository 668 and distribute the certificate bundles to one or more substrate entities 660 on the substrate network 652 and/or to one or more interface entities 662 on the network interface 656.

In one example, a second distribution service 666b may be implemented on the network interface 656. A distribution service 666 implemented on the network interface 656 may be communicatively coupled with the overlay network 654 and/or the substrate network 652. For example, the second distribution service 666b implemented on the network interface 656 may be communicatively coupled with one or more overlay entities 664 on the overlay network 654. The second distribution service 666b may distribute certificate bundles to one or more overlay entities 664 on the overlay network 654. In one example, the second distribution service 666b may obtain certificate bundles from a storage medium associated with the network interface 656, such as from a storage medium associated with an interface entity 612 on the network interface 656. For example, the second distribution service 666b may distribute a certificate bundle that has been installed in the storage medium associated with the network interface 656 and/or the interface entity 662. In one example, the first distribution service 666a may distribute a certificate bundle to an interface entity 662 on the network interface 656, and the second distribution service 666b may distribute the certificate bundle to one or more overlay entities 664 on the overlay network 654 after the certificate bundle has been installed in the storage medium associated with the interface entity 662.

As shown in FIG. 6B, each network entity 658 may include a provisioning module 670 and a storage medium 672. The provisioning module 670 may correspond to provisioning module 640 described with reference to FIG. 6A. The storage medium 672 may include the public key repository 626 of the network entity 638 described with reference to FIG. 6A. The provisioning module 670 associated with a network entity 658 may receive certificate bundles from the distribution service 666 and install the certificate bundle in the storage medium 672 associated with the network entity 658. The distribution service 666 may distribute a certificate bundle to the provisioning module 670 in connection with an initial provisioning of the network entity 658 and/or in connection with a periodic update. Additionally, or in the alternative, the distribution service 666 may distribute a certificate bundle to the provisioning module 670 in accordance with a respective phase of a certificate bundle distribution process.

In one example, a provisioning module 670 of an overlay entity 664 may send requests for a certificate bundle to a distribution service 666 by way of a gateway 674 between the network interface 656 and the overlay entities 664. Additionally, or in the alternative, the distribution service 666 may send the certificate bundles to the overlay entities 664 by way of the gateway 674, for example, in response to a request from a provisioning module 670. In one example, the gateway 674 may be a metadata interface configured for exchanging metadata between the network interface 656 and the overlay entities 664 In one example, the gateway 674 may be utilized between the network interface 656 and each of the overlay entities 664. Additionally, or in the alternative, the network interface 656 may include a set of gateways 674, with each gateway 674 corresponding to a respective overlay entity 664.

In one or more embodiments, the system 600 may include more or fewer components than the components illustrated in FIGS. 6A and 6B. The components illustrated in FIGS. 6A and 6B may be local to or remote from each other. The components illustrated in FIGS. 6A and 6B may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. Authenticating Network Entities

Network entities may utilize the CA certificates in a certificate bundle to authenticate other network entities associated with the virtual cloud network. For example, communications between network entities may be conducted according to a security protocol. The security protocol may include authenticating a network entity based on an entity certificate issued to the network entity by a CA, for example, prior to establishing communications with the network entity.

In one example, the entity certificate and a CA certificate corresponding to the CA that issued the entity certificate may represent at least a portion of a certificate chain. To authenticate the network entity, each signature-key pair in the certificate chain is validated. In one example, a top-level CA may issue the entity certificate, in which case the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate, and the public key of the intermediate CA; and (ii) the digital signature of the root CA in the intermediate CA certificate, and the public key of the root CA.

As used herein, the term "certificate authority certificate" or "CA certificate" refers to a digital certificate issued by a CA to establish its own identity and authenticity. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VAM during its lifecycle and may be automatically generated and managed by the virtual cloud network infrastructure. An instance principal certificate may have limited access to communicate with certain network entities based on permissions assigned to the network entity to which the instance principal certificate is issued.

As used herein, the term "digital certificate" refers to a digitally signed electronic document that binds a public key to the identity of an entity. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

6. Example Certificate Bundle Distribution Process

Figure 7:
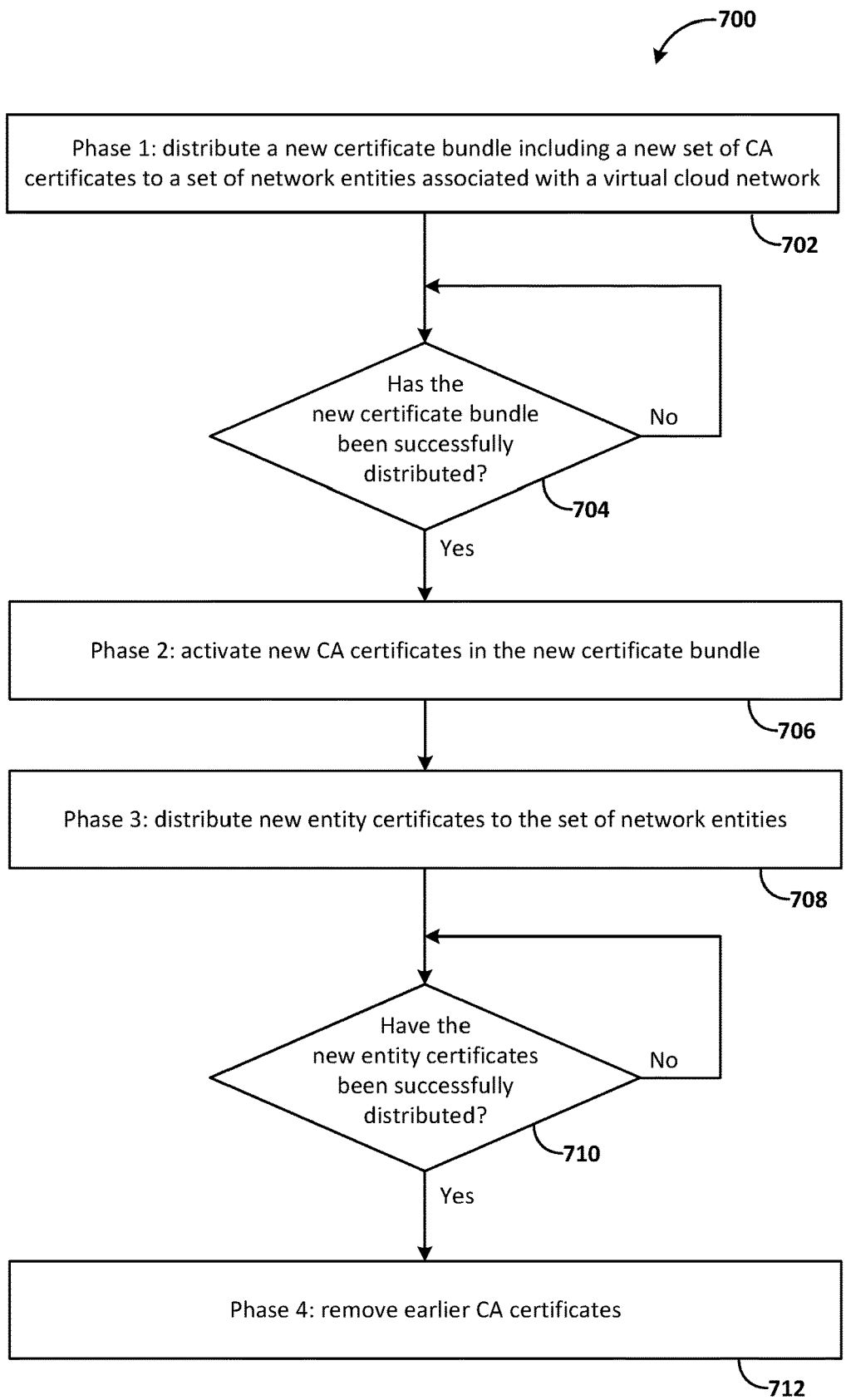
FIG. 7 is a flowchart that illustrates an example certificate bundle distribution process for distributing a set of CA certificates to network entities associated with a virtual cloud network in accordance with one or more embodiments.

Referring now to FIG. 7, operations pertaining to an example certificate bundle distribution process are further described. The operations 700 described with reference to FIG. 7 may be associated with distributing a new set of one or more CA certificates to a plurality of network entities for use in a certificate authentication process. The CA certificates may include root CA certificates and/or intermediate CA certificates. The CA certificates may be housed in a certificate bundle. One or more operations 700 illustrated in FIG. 7 may be modified, rearranged, or omitted all together.

Accordingly, the particular sequence of operations 700 illustrated in FIG. 7 should not be construed as limiting the scope of one or more embodiments. As shown in FIG. 7, operations 700 pertaining to the certificate bundle distribution process may include a series or sequence of phases. In one example, as shown, the operations 700 may include a series or sequence of phases, such as four (4) phases. In another example, the series or sequence of phases may include more or less than four (4) phases, for example, including all or a portion of the phases shown in FIG. 7.

In one example, the operations 700 may include, at block 702, distributing a new certificate bundle including a new set of one or more CA certificates to a set of network entities associated with a virtual cloud network. The new set of one or more CA certificates may include at least one new CA certificate. Additionally, or in the alternative, a set of new CA certificates may be added to existing certificate bundles.

At block 704, the operations 700 may include determining whether the new certificate bundle has been successfully distributed. When the new certificate bundle has been successfully distributed, the operations 700 may proceed to a next phase in the distribution process. The operation at block 702 and/or 704 may represent Phase 1 of a certificate bundle distribution process.

In one example, the operations 700 may include, at block 706, activating the CA certificates in the new certificate bundle. In one example, activating the CA certificate may include a CA corresponding to the CA certificate issuing one or more intermediate CA certificates. The operation at block 706 may represent Phase 2 of a certificate bundle distribution process.

In one example, the operations 700 may include, at block 708, distributing new entity certificates to the set of network entities. Additionally, or in the alternative, the operations 700 may include distributing new intermediate CA certificates, for example, corresponding to the new entity certificates.

At block 710, the operations 700 may include determining whether the new entity certificates have been successfully distributed. Additionally, or in the alternative, the operations may include determining whether the new intermediate CA certificates have been successfully distributed. When the new entity certificates (and/or the new intermediate CA certificates) have been successfully distributed, the operations 700 may proceed to a next phase in the distribution process. The operation at block 708 and 710 may represent Phase 3 of a certificate bundle distribution process.

In one example, the operations 700 may include, at block 712, removing earlier CA certificates that were distributed prior to the new CA certificates. For example, the earlier CA certificates may include CA certificates that are being superseded by the new CA certificates. Removing an earlier CA certificate with respect to a particular network entity may include deleting the earlier CA certificate from a storage medium associated with the particular network entity. For example, the operations 700 may include transmitting, to the particular network entity, an instruction to delete the earlier CA certificate from the storage medium. Rpensive to receiving the instruction, the particular network entity may delete the earlier CA certificate from the storage medium.

Additionally, or in the alternative, removing an earlier CA certificate with respect to a network entity may include replacing a first new certificate bundle with a second new certificate bundle, in which the first new certificate bundle includes the new CA certificates and the earlier CA certificates and the second new certificate bundle includes only the new CA certificates, thereby effectively removing the earlier CA certificates from the first new certificate bundle. The second new certificate bundle may be distributed to the particular network entity and installed in the storage medium associated with the particular network entity, and the first new certificate bundle may be deleted from the storage medium. The operation at block 712 may represent Phase 4 of a certificate bundle distribution process.

7. Validating Certificate Authority Datasets

Figure 8A:
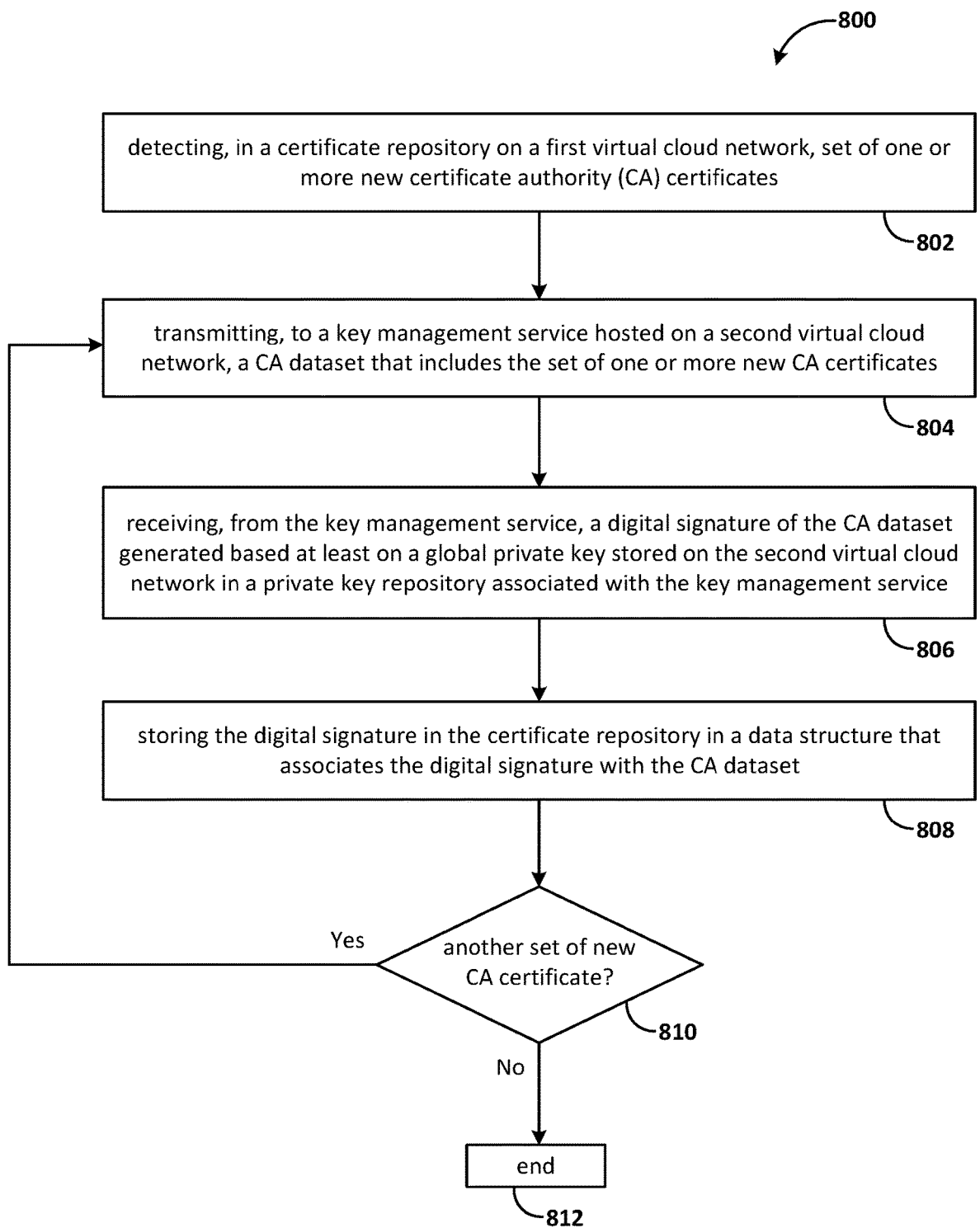
FIGS. 8A-8C are flowcharts that illustrates example operations pertaining to validating a certificate bundle using asymmetric keys in accordance with one or more embodiments.
Figure 8B:
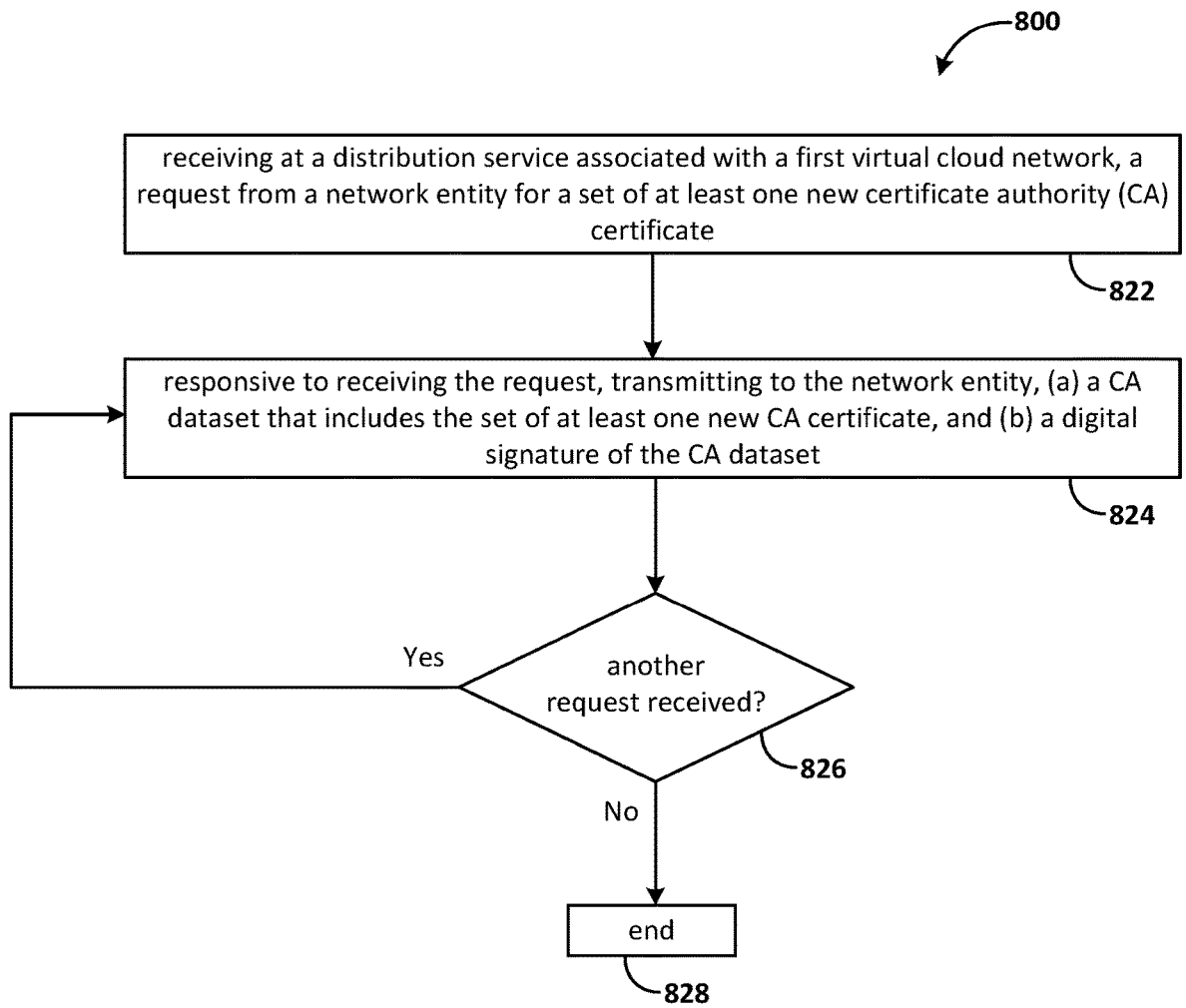
Figure 8C:
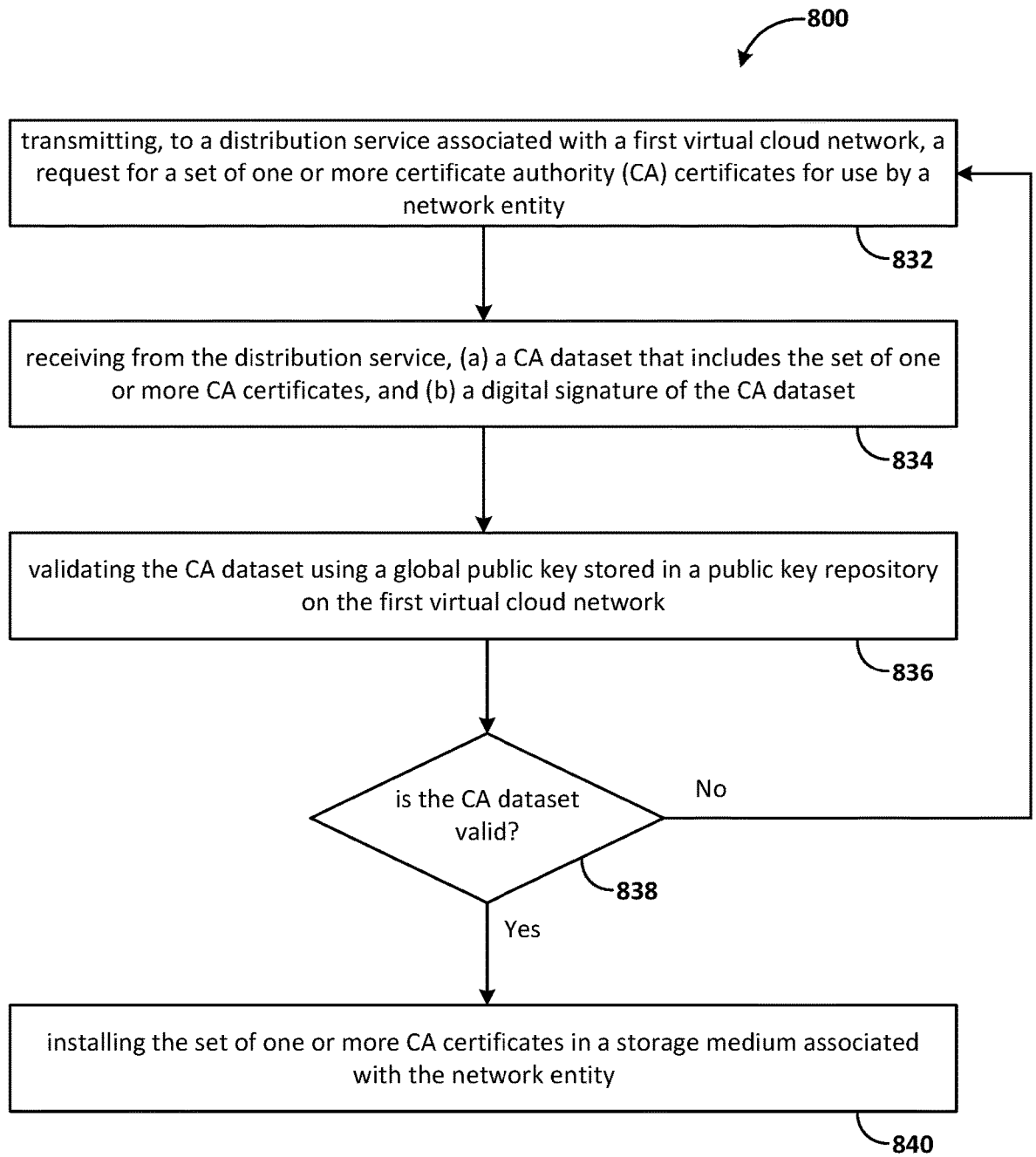

Referring now to FIGS. 8A-8C, operations 800 pertaining to validating CA datasets using asymmetric keys are further described. The operations 800 described with reference to FIGS. 8A-8C may represent at least a portion of a process for distributing certificate bundles to network entities and/or provisioning cloud resource instances, as respectively described herein. One or more operations 800 described with reference to in FIGS. 8A-8C may be modified, combined, rearranged, or omitted all together. Accordingly, the particular sequence of operations 800 described with reference to FIGS. 8A-8C should not be construed as limiting the scope of one or more embodiments.

A. Digital Signature Manager Operations

Referring to FIG. 8A, operations associated with a digital signature manager are further described. As shown in FIG. 8A, the operations 800 may include, at block 802, detecting, in a certificate repository on a first virtual cloud network, set of one or more new CA certificates. In one example, detecting the set of one or more new CA certificates may include identifying the one or more new CA certificates in the certificate repository, and determining that the one or more new CA certificates are unassociated with a current digital signature from the key management service.

At block 804, the operations 800 may include transmitting, to a key management service hosted on a second virtual cloud network, a CA dataset that includes the set of one or more new CA certificates. In one example, the CA dataset may include a certificate bundle, and the certificate bundle may include a set of CA certificates. The set of CA certificates in the certificate bundle may include the one or more new CA certificates. In one example, transmitting the CA dataset may include transmitting, to the key management service, a request for the key management service to digitally sign the CA dataset. Additionally, or in the alternative, the operations 800 may include transmitting a credential to the key management service to authenticate the request for the key management service to digitally sign the CA dataset.

At block 806, the operations 800 may include receiving, from the key management service, a digital signature of the CA dataset. The digital signature of the CA dataset may be generated based at least on a global private key stored on the second virtual cloud network in a private key repository associated with the key management service. At block 808, the operations 800 may include storing the digital signature in the certificate repository in a data structure that associates the digital signature with the CA dataset.

At block 810, the operations 800 may include determining whether the certificate repository includes another set of new CA certificates. For example, the operations 800 may include periodically checking the certificate repository for another set of new CA certificates. Additionally, or in the alternative, the operations 800 may include receiving a notification that the certificate repository includes another set of new CA certificates. When the certificate repository includes another set of new CA certificates, the operations may return to block 804. Additionally, or in the alternative, when the certificate repository does not include another set of new CA certificates, the operations 800 of the digital signature manager may end at block 812.

In one example, the operations 800 may include generating the at least one new CA certificate, for example, in connection with deploying a region and/or in connection with deploying the first virtual cloud network in the region. In one example, the at least one new CA certificate may include one or more a root CA certificates for issuing intermediate CA certificates and/or entity certificates to network entities associated with the first virtual cloud network.

In one example, the operations 800 may include transmitting to at least one network entity, the CA dataset and the digital signature of the CA dataset. The CA dataset and the digital signature of the CA dataset may be transmitted to the at least one network entity in response to a request from the at least one network entity, for example, as described with reference to FIG. 8C.

B. Distribution Service Operations

Referring to FIG. 8B, operations associated with a distribution service are further described. As shown in FIG. 8B, the operations 800 may include, at block 822 receiving at a distribution service associated with a first virtual cloud network, a request from a network entity for a set of at least one new certificate authority (CA) certificate. In one example, the request for the at least one new CA certificate may be associated with an initial provisioning of a cloud resource instance on the first virtual cloud network. Additionally, or in the alternative, the request for the at least one new CA certificate may be one of a series of periodic requests for an updated certificate bundle.

At block 824, the operations 800 may include, responsive to receiving the request, transmitting to the network entity, (a) a CA dataset that includes the set of at least one new CA certificate, and (b) a digital signature of the CA dataset. In one example, the operations 800 may include locating the CA dataset and the digital signature in a certificate repository. For example, a current CA dataset may be located based on one or more identifying indicia, such as an identification number or a timestamp associated with the CA dataset. At block 826, the operations may include determining whether another request from a network entity is received. When another request from a network entity is received, the operations may return to block 824. Alternatively, the operations of the distribution service may end at block 828.

In one example, responsive to receiving the request from the network entity, at block 822, the operations 800 may include determining whether a current CA dataset has already been transmitted to the network entity. A determination as to whether the current CA dataset has already been transmitted to the network entity may be performed based on a comparison of a timestamp corresponding to a digital signature of the CA dataset and a timestamp corresponding to a previous transmission of a CA dataset to the network entity. For example, the operations 800 may include determining a first timestamp corresponding to the digital signature of the CA dataset, determining a second timestamp corresponding to a previous transmission of a previous CA dataset to the network entity, and determining whether the second timestamp is earlier than the first timestamp. The operations 800 may include determining that a current CA dataset has yet to be transmitted to the network entity when the second timestamp is earlier than the first timestamp. Additionally, or in the alternative, the operations 800 may include determining that a current CA dataset has yet to be transmitted to the network entity when the second timestamp is later than the first timestamp. Responsive to the second timestamp being earlier than the first timestamp, the operations 800 may include transmitting the CA dataset and the digital signature of the CA dataset to the network entity.

In one example, the digital signature of the CA dataset may be generated by a key management service hosted on a second virtual cloud network. The key management service may generate the digital signature of the CA dataset using a global private key stored on the second virtual cloud network in a private key repository associated with the key management service. The CA dataset may be validatable, for example, by a network entity, using a global public key corresponding to the global private key. The global public key may be stored in a public key repository associated with the network entity.

In one example, the operations 800 may include validating the CA dataset using a global public key corresponding to the global private key prior to transmitting the CA dataset and the digital signature of the CA dataset to the network entity. The global public key utilized by the distribution service to validate the CA dataset may be stored in a public key repository associated with the distribution service. The global public key utilized by the distribution service may be an identical copy of a global public key utilized by the network entity to validate the CA dataset.

C. Network Entity Operations

Referring to FIG. 8C, operations associated with a network entity are further described. As shown in FIG. 8C, the operations 800 may include, at block 832 transmitting, to a distribution service associated with a first virtual cloud network, a request for a set of one or more certificate authority (CA) certificates for use by the network entity. At block 834, the operations 800 may include receiving from the distribution service, (a) a CA dataset that includes the set of one or more CA certificates, and (b) a digital signature of the CA dataset.

At block 836, the operations may include validating the CA dataset using a global public key stored in a public key repository on the first virtual cloud network. In one example, the global public key may be built into an operating system image of the network entity. The global public key used to validate the CA dataset may correspond to a global private key used by a key management service to generate the digital signature of the CA dataset. The key management service may be hosted on a second virtual cloud network, and the global private key may be stored on the second virtual cloud network in a private key repository associated with the key management service. In one example, the key management service may be a third-party service. At block 838, if the CA dataset is valid, the operations 800 may proceed to block 840. Alternatively, at block 838, if the CA dataset is not valid, the operations 800 may return to block 832. At block 840, the operations 800 may include installing the set of one or more CA certificates in a storage medium associated with the network entity. In one example, installing the set of one or more CA certificates may represent an operation of a provisioning process for the network entity, for example, as described with reference to FIGS. 9 and 10.

D. Further Features of Example Operations

Referring further to FIGS. 8A-8C, the first virtual cloud network described with respect to the operations 800 may be an ancillary VCN, for example, as described with reference to FIG. 6A. In one example, the first virtual cloud network may be located within a first region of a first realm. The first region may include a first set of one or more interconnected data centers upon which the first virtual cloud network is deployed, and the first realm may include a first IaaS system infrastructure. Additionally, or in the alternative, the second virtual cloud network may be a home VCN, for example, as described with reference to FIG. 6A. The second virtual cloud network may be located within a second region of a second realm. The second region may include a second set of one or more interconnected data centers upon which the second virtual cloud network is deployed. The second realm may include a second IaaS system infrastructure.

8. Provisioning Cloud Resource Instances

Figure 9:
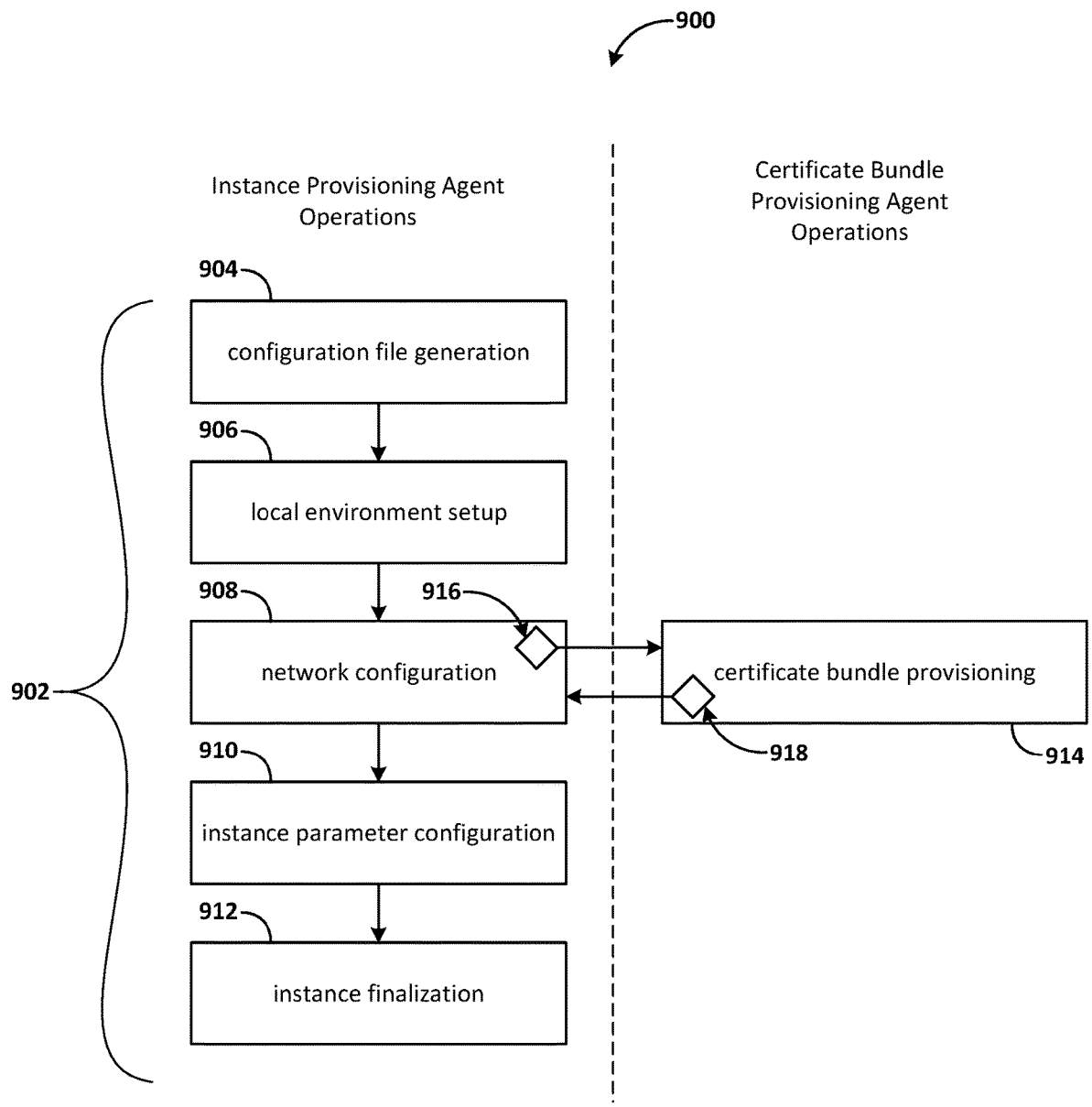
FIG. 9 is a flowchart that illustrates example operations pertaining to provisioning a cloud resource instance associated with a virtual cloud network in accordance with one or more embodiments.

Referring now to FIG. 9, an example operations for provisioning a cloud resource instance associated with a virtual cloud network are further described. Provisioning a cloud resource instance may include creating and configuring the cloud resource instance for use on the virtual cloud network. Upon having been provisioned, the cloud resource instance may be made available for use on the virtual cloud network. Following provisioning, various deployment operations may be performed, for example, by a customer or tenant of the cloud resource instance. As shown in FIG. 9, a provisioning process 900 may include a plurality of phases 902. Each of the phases 902 may include one or more operations for provisioning the cloud resource instance. The phases 902, and/or the operations associated with a respective phase 902, of the provisioning process 900 may be modified, rearranged, or omitted all together. Accordingly, the particular sequence of the phases 902 and/or associated operations described with reference to FIG. 9 should not be construed as limiting the scope of one or more embodiments.

As shown in FIG. 9, the provisioning process 900 may include at least one of: a configuration file generation phase 904, a local environment setup phase 906, a network configuration phase 908, an instance parameter configuration phase 910, or an instance finalization phase 912. Additionally, or in the alternative, the provisioning process 900 may include a certificate bundle provisioning phase 914.

In one example, the configuration file generation phase 904 may include one or more operations associated with identifying data sources available to the provisioning module and/or the instance provision agent, and generating configuration files accordingly. The available data sources may include a distribution service, a certificate repository, and/or a storage medium associated with a network entity. Additionally, or in the alternative, the available data sources may include metadata sources, such as cloud provider metadata services and/or instance-specific metadata services.

In one example, the local environment setup phase 906 may include one or more operations associated with setting up the local environment of the cloud resource instance. For example, the local environment phase may include hostname configuration, setting up user accounts, and executing scripts or commands specified in data sources referenced in connection with the provisioning process 900.

In one example, the network configuration phase 908 may include one or more operations associated with configuring network interfaces and related settings, such as assigning IP addresses, configuring DNS settings, defining routes, and managing network bonding or bridging configurations. Additionally, or in the alternative, the network configuration phase 908 may include configuring security protocol settings, including creating certificate bundle file directories, generating pointers to the certificate bundle filed directories, and/or acquiring a network entity certificate(s) for the cloud resource instance.

In one example, the instance parameter configuration phase 910 may include one or more operations associated with processing configuration files generated in the configuration file generation phase 904 and/or one or more operations associated with applying specified settings to the cloud resource instance. The specified settings may include package installation settings, user-specific settings, file modification settings, and/or service configuration settings.

In one example, the instance finalization phase 912 may include one or more operations associated with additional instance configuration scripts and/or system cleanup tasks.

In one example, the certificate bundle provisioning phase 914 may include one or more operations associated with retrieving, validating, and installing a certificate bundle that includes a set of CA certificates. For example, the certificate bundle provisioning phase 914 may include one or more operations described with reference to FIG. 10.

In one example, at least a portion of the provisioning process 900 may be performed by a provisioning module associated with the cloud resource instance. Additionally, or in the alternative, a portion of the provisioning process 900 may be performed by one or more provisioning agents. The one or more provision agents may represent a portion of the provisioning module. Additionally, or in the alternative, a provisioning agent may represent a service executing on the virtual cloud network. The provisioning module may call the one or more provisioning agents and prompt the one or more provisioning agents to perform at least a portion of the provisioning process.

In one example, as shown, the provisioning process may include one or more operations performed by an instance provisioning agent and one or more operations performed by a certificate bundle provisioning agent. The instance provisioning agent and/or the certificate bundle provisioning agent may represent a portion of the provisioning module or a service executing on the virtual cloud network. In one example, the instance provisioning agent may perform at least one of: the configuration file generation phase 904, the local environment setup phase 906, the network configuration phase 908, the instance parameter configuration phase 910, or the instance finalization phase 912. The certificate bundle provisioning agent may perform one or more operations associated with the certificate bundle provisioning phase 914.

In one example, the certificate bundle provisioning phase 914 may be triggered by a certificate bundle-retrieval trigger 916 within the provisioning process 900. The certificate bundle-retrieval trigger 916 may be an executable command associated with one or more operations of the provisioning process 900. For example, as shown, the certificate bundle-retrieval trigger may be associated with the network configuration phase 908. Responsive to detecting the certificate bundle-retrieval trigger 916, the instance provisioning agent may prompt the certificate bundle provisioning agent to perform one or more operations associated with the certificate bundle provisioning phase 914. After having completed the one or more operations associated with the certificate bundle provisioning phase 914, the certificate bundle provisioning agent may prompt the instance provisioning agent that the one or more operations associated with the certificate bundle provisioning phase 914. For example, the certificate bundle provisioning phase 914 may include a certificate bundle-installed trigger 918. Responsive to detecting the certificate bundle-installed trigger 918, the certificate bundle provisioning agent may send a notification to the instance provisioning agent to prompt the instance provisioning agent that the one or more operations associated with the certificate bundle provisioning phase 914 are complete. Responsive to receiving the prompt from the certificate bundle provisioning agent, the instance provisioning agent may perform one or more subsequent operations of the provisioning process 900.

One or more phases of the provisioning process 900 may be performed prior to detecting the certificate bundle-retrieval trigger 916. For example, the configuration file generation phase 904 and the local environment setup phase 906 may be performed prior to detecting the certificate bundle-retrieval trigger 916. Additionally, or in the alternative, at least a portion of the network configuration phase may be performed prior to detecting the certificate bundle-retrieval trigger 916. One or more phases of the provisioning process 900 may be performed after the certificate bundle-installed trigger 918, such as after the certificate bundle provisioning phase 914 is complete. For example, the instance parameter configuration phase 910 and the instance finalization phase 912 may be performed after the certificate bundle-installed trigger 918. Additionally, or in the alternative, at least a portion of the network configuration phase 908 may be performed after the certificate bundle-installed trigger 918.

In one example, the provisioning process 900 may include initializing a security protocol for secure communication between a cloud resource instance and another network entity associated with the virtual cloud network. The security protocol may be initialized as part of the network configuration phase 908. For example, the security protocol may be initialized to allow performance of further operations associated with the network configuration phase 908 and/or one or more other phases of the provisioning process 900.

In one example, initializing the security protocol may include receiving an entity certificate from a network entity, authenticating the entity certificate using at least one CA certificate of the certificate bundle. In one example, after having initialized the security protocol, one or more subsequent operations of the provisioning process 900 may be performed, such as one or more operations of the network configuration phase 908, the instance parameter configuration phase 910, and/or the instance finalization phase 912. In one example, the one or more subsequent operations of the provisioning process 900 may include, upon having initialized the security protocol, receiving a first secure communication from the network entity in accordance with the security protocol, or sending a second secure communication to the network entity in accordance with the security protocol.

In one example, the cloud resource instance may lack access to at least one CA certificate prior to detecting the certificate bundle-retrieval trigger 916 and/or prior to completion of the certificate bundle provisioning phase 914. The cloud resource instance may gain access to the CA certificates upon completion of the certificate bundle provisioning phase 914. In one example, the one or more subsequent operations of the provisioning process 900 performed after the certificate bundle provisioning phase 914 may include one or more operations that utilize the secure communication established between the cloud resource instance and the network entity according to the security protocol.

In one example, the at least one subsequent operation of the provisioning process 900 may include sending, to a service agent executing on the cloud resource instance, a notification that includes a location of the certificate bundle in the storage medium. Additionally, or in the alternative, the certificate bundle may be sent to the service agent. The service agent may include, or may be associated with, an overlay service, a substrate service, or an interface service. The service agent may perform one or more provisioning operations associated with provisioning an overlay service, a substrate service, or an interface service. For example, the service agent may perform, with respect to the overlay service, a substrate service, or an interface service, one or more operations associated with the provisioning process 900 described herein.

9. Retrieving and Installing Certificate Bundles

Figure 10:
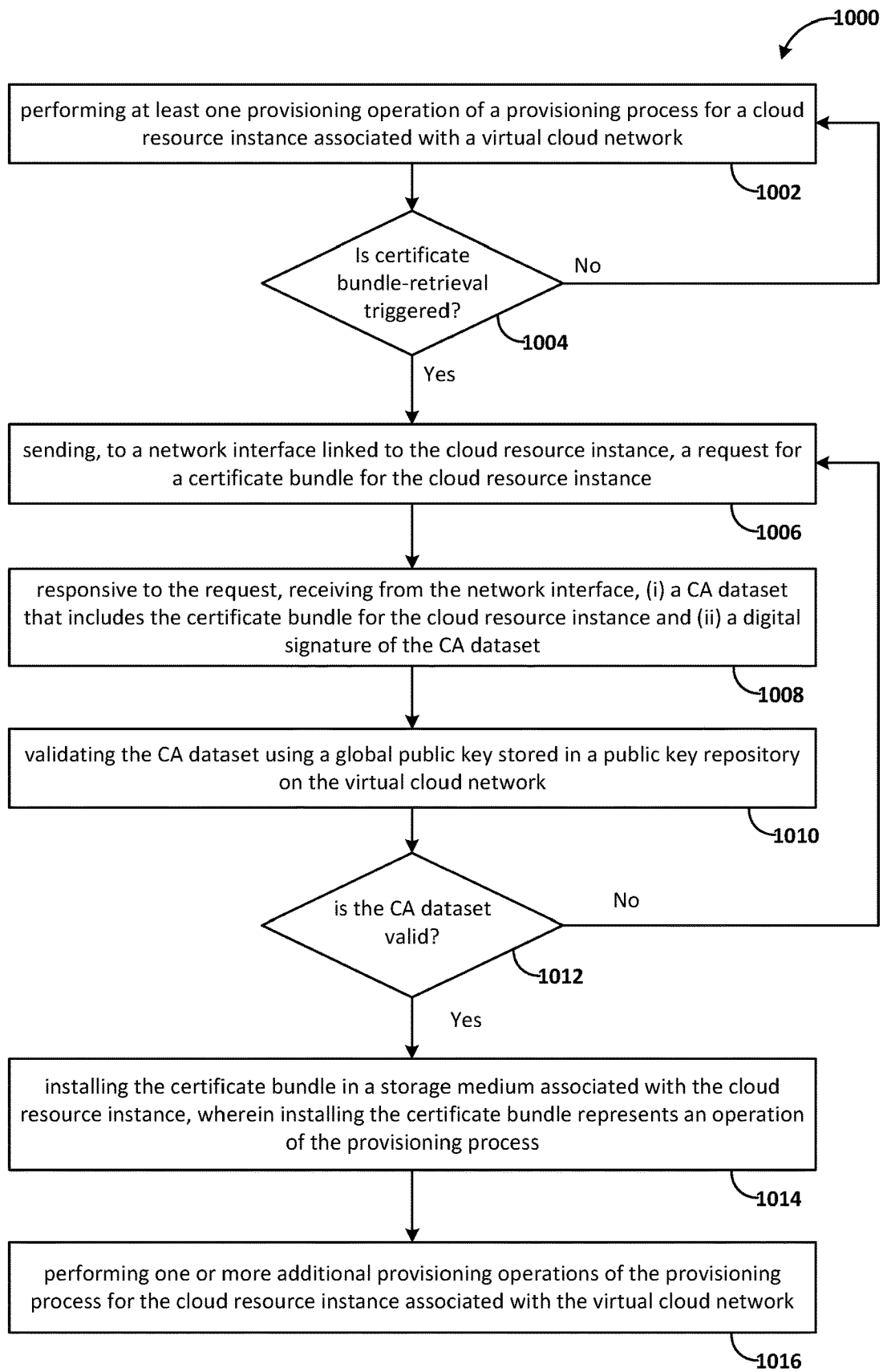
FIG. 10 is a flowchart that illustrates further example operations pertaining to provisioning a cloud resource instance associated with a virtual cloud network in accordance with one or more embodiments.

Referring now to FIG. 10, operations 1000 pertaining to provisioning network entities associated with a virtual cloud network are further described. One or more operations 1000 described with reference to in FIG. 10 may be modified, rearranged, or omitted all together. Accordingly, the particular sequence of operations 1000 described with reference to FIG. 10 should not be construed as limiting the scope of one or more embodiments. In one example, the operations 1000 described with reference to FIG. 10 may represent a portion of a provisioning process for provisioning a cloud resource instance associated with a virtual cloud network. For example, the operations 1000 described with reference to FIG. 10 may include operations associated with a certificate bundle provisioning phase of the provisioning process.

As shown in FIG. 10, the operations 1000 may include, at block 1002, performing at least one provisioning operation of a provisioning process for a cloud resource instance associated with a virtual cloud network. In one example, the at least one provisioning operation may include at least one operation associated with a configuration file generation phase and/or at least one operation associated with a local environment setup phase, for example, as described with reference to FIG. 9. Additionally, or in the alternative, the at least one provisioning operation may include at least one operation associated with a network configuration phase, for example, as described with reference to FIG. 9.

During the provisioning process, a certificate bundle retrieval may be triggered. At block 1004, the operations 1000 may include detecting whether the certificate bundle-retrieval is triggered. The certificate bundle-retrieval trigger may be an executable command associated with one or more operations of the provisioning process, for example, as described with reference to FIG. 9. The executable command may be incorporated into computer-executable instructions executed, for example, by an instance provisioning agent. In one example, the instance provisioning agent may detect that the certificate bundle-retrieval is triggered, for example, based on the executable command in the computer-executable instructions. Responsive to detecting the certificate bundle-retrieval trigger, the instance provisioning agent may prompt a certificate bundle provisioning agent to perform one or more operations associated with the certificate bundle provisioning phase, for example, as described with reference to FIG. 9. The certificate bundle provisioning agent to perform one or more operations associated with the certificate bundle provisioning phase according to executable operations executed by the certificate bundle provisioning agent.

If the certificate bundle-retrieval is not triggered, the operations 1000 may return to block 1002, and an additional operation of the provisioning process may be performed. When the certificate bundle-retrieval is triggered, the operations 1000 may proceed to block 1006.

At block 1006, the operations may include sending, to a network interface linked to the cloud resource instance, a request for a certificate bundle for the cloud resource instance. For example, the request for the certificate bundle may be sent to a distribution service executing on the network interface. The request for the certificate bundle for the cloud resource instance may be sent by the certificate bundle provisioning agent, for example, as described with reference to FIG. 9. The location of the network interface and/or the distribution service may be determined from a network directory address associated with the network interface and/or the distribution service executing on the network interface. The network directory address may be incorporated into computer-executable instructions executed, for example, by the certificate bundle provisioning agent. The request for the certificate bundle may include configuration information about the cloud resource instance. The network interface may select the certificate bundle based on the configuration information. The request for the certificate bundle may include a network location for the network interface to send the certificate bundle, such as a network directory address of the cloud resource instance and/or a file directory associated with the cloud resource instance where the certificate bundle may be installed.

Responsive to receiving the request, the operations may include, at block 1008, receiving from the network interface, (i) a CA dataset that includes the certificate bundle for the cloud resource instance and (ii) a digital signature of the CA dataset. The certificate bundle may include a set of one or more CA certificates. The set of one or more CA certificates may include one or more root CA certificates and/or one or more intermediate CA certificates.

At block 1010, the operations may include validating the CA dataset using a global public key stored in a public key repository on the first virtual cloud network. In one example, the global public key may be built into an operating system image of the cloud resource instance. The global public key used to validate the CA dataset may correspond to a global private key used by a key management service to generate the digital signature of the CA dataset. The key management service may be hosted on a second virtual cloud network, and the global private key may be stored on the second virtual cloud network in a private key repository associated with the key management service. At block 1012, if the CA dataset is valid, the operations 800 may proceed to block 1014. Alternatively, at block 1012, if the CA dataset is not valid, the operations 800 may return to block 1006.

At block 1014, the operations 1000 may include installing the certificate bundle in a storage medium associated with the cloud resource instance. Installing the certificate bundle may include making the certificate bundle available for the cloud resource instance to use in validating network entities. For example, installing the certificate bundle may include creating a file and storing the certificate bundle in the file. Additionally, or in the alternative, installing the certificate bundle may include creating a file directory for the certificate bundle and/or specifying a location where processes or applications that may run on the cloud resource instance can find the certificate bundle. For example, the location of the certificate bundle may be specified in an operating system configuration file, in a registry settings file, or in an executable file. Installing the certificate bundle may represent an operation of the provisioning process. In one example, prior to installing the certificate bundle, the operations 1000 may include one or more validation operations with respect to the certificate bundle. In one example, the operations 1000 may include performing a validation of the certificate bundle, determining that the certificate bundle passes the validation, and installing the certificate bundle in the storage medium responsive to determining that the certificate bundle passes the validation.

In one example, the validation of the certificate bundle may include executing a subject key identifier check for at least a subset of CA certificates from among the set of CA certificates in the certificate bundle. The validation operation may include determining that each CA certificate of the subset of CA certificates passes the subject key identifier check. In one example, the subject key identifier check may be performed for all of the CA certificates in the certificate bundle. For a particular CA certificate, the subject key identifier check may include: computing a hash value of a public key corresponding to the particular CA certificate, determining a subject key identifier corresponding to the particular CA certificate, and comparing the hash value to the subject key identifier. The subject key identifier may be a digital signature on the CA certificate. The subject key identifier may correspond to a private key associated with the public key. The private key and the public key may represent an asymmetric key pair. For example, the subject key identifier, such as the digital signature on the CA certificate, may have been generated using the private key. The subject key identifier may be decrypted using a hash function.

In one example, the subject key identifier check may further include determining a match between the hash value and the subject key identifier corresponding to the particular CA certificate. The particular CA certificate may be determined to pass the subject key identifier check when there is a match between the hash value and the subject key identifier. In one example, the match between the hash value and the subject key identifier may be determined by decrypting the subject key identifier using a hash function, and comparing the resulting decryption to the hash value of the public key. When the public key matches the subject key identifier, the decryption of the subject key identifier matches the hash value of the public key. The validation may include determining, based on the match, that the particular CA certificate passes the subject key identifier check.

In one example, the operations 1000 may include determining that the certificate bundle fails the validation, and generating an alert for display on a user interface device indicating that the certificate bundle failed the validation. Additionally, or in the alternative, responsive to determining that the certificate bundle having failed the validation, the operations 1000 may include sending, to the network interface (and/or to a distribution service executing on the network interface), a subsequent request for an updated certificate bundle for the cloud resource instance. Responsive to receiving the subsequent request at the network interface (and/or at the distribution service), the operations 1000 may include the network interface sending the updated certificate bundle for the cloud resource instance. Additionally, or in the alternative, the operations 1000 may include receiving from the network interface, the updated certificate bundle for the cloud resource instance. The updated certificate bundle may include an updated set of CA certificates. The operations 1000 may further include performing a subsequent validation of the updated certificate bundle. For example, the subsequent validation may include a signature key identifier check as described above. Responsive to determining that the updated certificate bundle passes the subsequent validation, the operations 1000 may include installing the updated certificate bundle in the storage medium.

After having installed the certificate bundle at block 1014, the operations 1000 may include, at block 1016, further performing one or more additional provisioning operations of the provisioning process for the cloud resource instance associated with the virtual cloud network. In one example, the one or more additional provisioning operations may include at least one operation associated with the network configuration phase, for, example, as described with reference to FIG. 9. For example, the one or more additional provisioning operations may include configuring one or more network configuration settings for the cloud resource instance. The one or more network configuration settings may be configured as part of the network configuration phase. In one example, the one or more additional provisioning operations of the provisioning process may be triggered by a certificate bundle-installed trigger, as described with reference to FIG. 9. The certificate bundle-installed trigger may be an executable command incorporated into computer-executable instructions executed by the certificate bundle provisioning agent. Responsive to detecting the certificate bundle-installed trigger, the certificate bundle provisioning agent may send a notification to the instance provisioning agent to prompt the instance provisioning agent that the one or more operations associated with the certificate bundle provisioning phase are complete. Responsive to receiving the prompt from the certificate bundle provisioning agent, the instance provisioning agent may perform one or more subsequent operations of the provisioning process.

In one example, at block 1016, the operations 1000 may include performing a network configuration stage of the provisioning process. During or subsequent to the network configuration stage, the operations 1000 may include performing at least one of: detecting the certificate bundle-retrieval trigger, receiving the certificate bundle, installing the certificate bundle in the storage medium. Additionally, or in the alternative, the operations 1000 may include generating a file directory in the storage medium, installing the certificate bundle in the file directory, and/or sending, to a service agent executing on the cloud resource instance, a message including a directory path to the file directory. Additionally, or in the alternative, the one or more additional provisioning operations of the provisioning process at block 1016 may include at least one operation associated with the instance parameter configuration phase, and/or at least one operation associated with the instance finalization phase, for example, as described with reference to FIG. 9. The one or more additional provisioning operations of the provisioning process may be performed, at block 1016, by the instance provisioning agent, for example, according to computer-executable instructions executed by the instance provision agent.

8. Miscellaneous; Extensions

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer readable media comprising instructions which, when executed by one or more hardware processors, causes performance of operations comprising:
    detecting, in a certificate repository on a first virtual cloud network, at least one new certificate authority (CA) certificate;
    transmitting, to a key management service hosted on a second virtual cloud network, a CA dataset comprising the at least one new CA certificate;
    receiving, from the key management service, a digital signature of the CA dataset, wherein the digital signature of the CA dataset is generated based at least on a global private key, wherein the global private key is stored on the second virtual cloud network in a private key repository associated with the key management service;
    storing the digital signature in the certificate repository, wherein the certificate repository comprises a data structure that associates the digital signature with the CA dataset;
    wherein the first virtual cloud network comprises a first system infrastructure, and the second virtual cloud network comprises a second system infrastructure, wherein the first system infrastructure differs from the second system infrastructure.

2. The media of claim 1,
    wherein the first virtual cloud network is located within a first region of a first realm, the first region comprising a first set of one or more interconnected data centers upon which the first virtual cloud network is deployed, and the first realm comprising a first infrastructure-as-a-service (IaaS) system infrastructure; and
    wherein the second virtual cloud network is located within a second region of a second realm, the second region comprising a second set of one or more interconnected data centers upon which the second virtual cloud network is deployed, and the second realm comprising a second IaaS system infrastructure.

3. The media of claim 2, wherein the operations further comprise:
    generating the at least one new CA certificate in connection with deploying the first region and/or the first virtual cloud network.

4. The media of claim 3, wherein the at least one new CA certificate comprises a root CA certificate for issuing intermediate CA certificates and/or entity certificates to network entities associated with the first virtual cloud network.

5. The media of claim 1, wherein the operations further comprise:
transmitting to at least one network entity, the CA dataset and the digital signature of the CA dataset.

6. The media of claim 1, wherein detecting the at least one new CA certificate comprises:
identifying the at least one CA certificate; and
determining that the at least one CA certificate is unassociated with a current digital signature from the key management service.

7. The media of claim 1, wherein the CA dataset comprises a certificate bundle, and wherein the certificate bundle comprises a set of CA certificates, the set of CA certificates including the at least one new CA certificate.

8. The media of claim 1, wherein transmitting the CA dataset to the key management service comprises:
transmitting, to the key management service, a request for the key management service to digitally sign the CA dataset.

9. The media of claim 8, wherein transmitting the CA dataset to the key management service comprises:
transmitting a credential to the key management service to authenticate the request for the key management service to digitally sign the CA dataset.

10. One or more non-transitory computer readable media comprising instructions which, when executed by one or more hardware processors, causes performance of operations comprising:
receiving at a distribution service associated with a first virtual cloud network, a request from a network entity for at least one new certificate authority (CA) certificate; and
responsive to receiving the request, transmitting to the network entity, (a) a CA dataset comprising the at least one new CA certificate, and (b) a digital signature of the CA dataset,
wherein the digital signature of the CA dataset has been generated, by a key management service hosted on a second virtual cloud network, using a global private key;
wherein the global private key is stored on the second virtual cloud network in a private key repository associated with the key management service, and
wherein the CA dataset is validatable with a first global public key corresponding to the global private key, wherein the first global public key is stored in a public key repository associated with the network entity;
wherein the first virtual cloud network comprises a first system infrastructure, and the second virtual cloud network comprises a second system infrastructure, wherein the first system infrastructure differs from the second system infrastructure.

11. The media of claim 10, wherein the operations further comprise:
prior to transmitting the CA dataset and the digital signature of the CA dataset to the network entity, validating the CA dataset using a second global public key corresponding to the global private key, wherein the second global public key is stored in a second public key repository associated with the distribution service.

12. The media of claim 11, wherein validating the CA dataset comprises:
generating a first hash value by applying a hash function to the CA dataset;
generating a second hash value by decrypting the digital signature of the CA dataset using the second global public key;
comparing the first hash value to the second hash value; and
determining that the first hash value matches the second hash value.

13. The media of claim 10, wherein the operations further comprise:
responsive to receiving the request, locating the CA dataset and the digital signature in a certificate repository.

14. The media of claim 10,
wherein the request for the at least one new CA certificate is associated with an initial provisioning of a cloud resource instance on the first virtual cloud network; or
wherein the request for the at least one new CA certificate is one of a series of periodic requests for an updated certificate bundle.

15. The media of claim 10, wherein the CA dataset comprises a certificate bundle, and wherein the certificate bundle comprises a set of CA certificates, the set of CA certificates including the at least one new CA certificate.

16. The media of claim 10, wherein the operations further comprise:
responsive to receiving the request:
determining a first timestamp corresponding to the digital signature of the CA dataset;
determining a second timestamp corresponding to a previous transmission to the network entity, the previous transmission comprising a previous CA dataset including one or more previous CA certificates;
determining that the second timestamp is earlier than the first timestamp; and
responsive to determining that the second timestamp is earlier than the first timestamp, transmitting the CA dataset and the digital signature of the CA dataset to the network entity.

17. The media of claim 10,
wherein the first virtual cloud network is located within a first region of a first realm, the first region comprising a first set of one or more interconnected data centers upon which the first virtual cloud network is deployed, and the first realm comprising a first infrastructure-as-a-service (IaaS) system infrastructure; and
wherein the second virtual cloud network is located within a second region of a second realm, the second region comprising a second set of one or more interconnected data centers upon which the second virtual cloud network is deployed, and the second realm comprising a second IaaS system infrastructure.

18. The media of claim 10, wherein the operations further comprise:
prior to receiving the request from the network entity:
detecting, in a certificate repository on the first virtual cloud network, at least one new CA certificate;
transmitting the CA dataset to the key management service;
receiving, from the key management service, the digital signature of the CA dataset;
storing the digital signature in the certificate repository, wherein the certificate repository comprises a data structure that associates the digital signature with the CA dataset.

19. One or more non-transitory computer readable media comprising instructions which, when executed by one or more hardware processors, causes performance of operations comprising:
- transmitting, to a distribution service associated with a first virtual cloud network, a request for at least one certificate authority (CA) certificate for use by a network entity;
- receiving from the distribution service, (a) a CA dataset comprising the at least one CA certificate, and (b) a digital signature of the CA dataset,
  - wherein the digital signature of the CA dataset has been generated, by a key management service hosted on a second virtual cloud network, using a global private key, and
  - wherein the global private key is stored on the second virtual cloud network in a private key repository associated with the key management service, and
- validating the CA dataset using a global public key corresponding to the global private key, wherein the global public key is stored in a public key repository on the first virtual cloud network;
- installing the at least one CA certificate in a storage medium associated with the network entity;
- wherein the first virtual cloud network comprises a first system infrastructure, and the second virtual cloud network comprises a second system infrastructure, wherein the first system infrastructure differs from the second system infrastructure.

20. The media of claim 19,
- wherein installing the at least one CA certificate in the storage medium represents an operation of a provisioning process for the network entity.

21. The media of claim 20, wherein the operations further comprise:
- detecting a certificate bundle-retrieval trigger during the provisioning process; and
- transmitting the request for the at least one CA certificate responsive to detecting the certificate bundle-retrieval trigger.

22. The media of claim 21, wherein the operations further comprise:
- performing an additional operation of the provisioning process after installing the at least one CA certificate.

23. The media of claim 19, wherein the global public key is built into an operating system image of the network entity.

24. The media of claim 19, wherein the key management service is a third-party service.

25. The media of claim 19,
- wherein the first virtual cloud network is located within a first region of a first realm, the first region comprising a first set of one or more interconnected data centers upon which the first virtual cloud network is deployed, and the first realm comprising a first infrastructure-as-a-service (IaaS) system infrastructure; and
- wherein the second virtual cloud network is located within a second region of a second realm, the second region comprising a second set of one or more interconnected data centers upon which the second virtual cloud network is deployed, and the second realm comprising a second IaaS system infrastructure.

26. One or more non-transitory computer readable media comprising instructions which, when executed by one or more hardware processors, causes performance of operations comprising:
- transmitting, from a network entity to a distribution service, a request for at least one certificate authority (CA) certificate, wherein the network entity and the distribution service are associated with a first virtual cloud network;
- wherein the distribution service receives the request;
- wherein responsive to receiving the request, the distribution service transmits to the network entity, (a) a CA dataset comprising the at least one CA certificate, and (b) a digital signature of the CA dataset,
  - wherein the digital signature of the CA dataset has been generated, by a key management service hosted on a second virtual cloud network, using a global private key,
  - and wherein the distribution service validates the CA dataset using a first global public key corresponding to the global private key;
- receiving, at the network entity, the CA dataset comprising the at least one CA certificate and the digital signature of the CA dataset;
- validating the CA dataset using a second global public key corresponding to the global private key;
- installing the at least one CA certificate in a storage medium associated with the network entity;
- wherein the global private key is stored on the second virtual cloud network in a private key repository associated with the key management service, and
- wherein the first global public key is stored on the first virtual cloud network in a public key repository associated with the network entity.

27. The media of claim 26, wherein:
- the second global public key is stored on the first virtual cloud network in a second public key repository associated with the distribution service;
- the distribution service determines, based on validating the CA dataset, that the CA dataset is valid; and
- wherein the distribution service transmits the CA dataset and the digital signature of the CA dataset to the network entity subsequent to determining that the CA dataset is valid.

28. The media of claim 26, wherein the operations further comprise:
- detecting a certificate bundle-retrieval trigger during a provisioning process for the network entity; and
- transmitting the request for the at least one CA certificate responsive to detecting the certificate bundle-retrieval trigger.

29. The media of claim 26, wherein the first global public key and the second global public key are identical.

* * * * *